(12) United States Patent
Yuyama et al.

(10) Patent No.: US 7,040,070 B2
(45) Date of Patent: *May 9, 2006

(54) TABLET PACKING APPARATUS

(75) Inventors: Shoji Yuyama, Toyonaka (JP);
Hiroyuki Yuyama, Toyonaka (JP);
Tsuyoshi Kodama, Toyonaka (JP);
Hidenori Murakami, Toyonaka (JP)

(73) Assignee: Yuyama Mfg. Co., Ltd., Osaka (JP)

( * ) Notice: Subject to any disclaimer, the term of this patent is extended or adjusted under 35 U.S.C. 154(b) by 192 days.

This patent is subject to a terminal disclaimer.

(21) Appl. No.: 10/664,079

(22) Filed: Sep. 17, 2003

(65) Prior Publication Data

US 2004/0060943 A1    Apr. 1, 2004

Related U.S. Application Data

(62) Division of application No. 09/828,896, filed on Apr. 10, 2001, now Pat. No. 6,644,504.

(30) Foreign Application Priority Data

Apr. 11, 2000    (JP) .............................. 2000-109302

(51) Int. Cl.
B65B 35/54    (2006.01)

(52) U.S. Cl. ................................ 53/154; 53/57; 53/505

(58) Field of Classification Search ................. 53/154, 53/57, 58, 505; 221/265, 264, 92, 123, 124, 221/130, 131, 289
See application file for complete search history.

(56) References Cited

U.S. PATENT DOCUMENTS

| 5,709,063 A | 1/1998 | Yuyama et al. |
|---|---|---|
| 5,787,678 A | 8/1998 | Koike et al. |
| 5,852,911 A | 12/1998 | Yuyama et al. |
| 5,901,876 A | 5/1999 | Yuyama et al. |
| 6,012,602 A | 1/2000 | Yuyama et al. |
| 6,145,700 A | 11/2000 | Takahashi et al. |
| 6,202,385 B1 | 3/2001 | Kim |
| 6,263,259 B1 * | 7/2001 | Bartur ........................ 700/240 |
| 6,349,848 B1 | 2/2002 | Uema et al. |
| 6,508,045 B1 | 1/2003 | Kim |

FOREIGN PATENT DOCUMENTS

GB    2344194    * 5/2000

* cited by examiner

*Primary Examiner*—Stephen F. Gerrity
*Assistant Examiner*—Hemant M. Desai
(74) *Attorney, Agent, or Firm*—Wenderoth, Lind & Ponack, L.L.P.

(57) ABSTRACT

A tablet packing apparatus in which there is no risk that next tablets will be mixed into tablets previously discharged. The packing apparatus includes a plurality of feeder vessels (36) containing the tablets, a plurality of mounting bases (32) on which respective feeder vessels (36) are mounted, and a tablet reserving member (200) disposed below the mounting base (32) and reserving the tablets fed from the feeder vessels (36) and a shutter (203,300) which is movable to open and close the lower opening of the tablet reserving member (200). The apparatus further comprises a LED (201) which is turned on when the tablets are fed to the tablet reserving member (200) and a sensor (206, 301a, 301b) for detecting opening or closing operation of the shutter (203), whereby when the sensor (206, 301a, 301b) detects the opening operation of the shutter (203,300), the LED (201) is turned off.

7 Claims, 30 Drawing Sheets

TABLET PACKING APPARATUS

This is a divisional application of Ser. No. 09/828,896, filed Apr. 10, 2001, now U.S. Pat. No. 6,644,504, issued on Nov. 11, 2003.

TECHNICAL FIELD

The present invention relates to a tablet packing apparatus and more particularly to a tablet packing apparatus which is suited to feed tablets to a tablet vessel.

BACKGROUND OF THE INVENTION

Conventionally, there has been known a tablet packing apparatus which is provided with a tablet feed section comprising a plurality of feeder vessels containing the tablets and a plurality of mounting bases on which respective feeder vessels are mounted and also provided with a tablet reserving member disposed below the mounting base, whereby when the tablets are discharged into the tablet reserving member, the shutter is opened to feed the tablets in the tablet reserving member into a tablet vessel.

However, in the conventional tablet packing apparatus, there has been a disadvantage that next tablets may be discharged into the tablet reserving member before the tablets in the tablet reserving member are fed.

SUMMARY OF THE INVENTION

It is an object of the present invention to provide a tablet packing apparatus in which there is no risk that next tablets are mixed into tablets previously discharged.

In order to solve the above-described problems, the present invention provides a tablet packing apparatus, the apparatus comprising:

a plurality of feeder vessels containing the tablets;

a plurality of mounting bases on which respective feeder vessels are mounted;

a tablet reserving member disposed below the mounting base, the tablet reserving member reserving the tablets fed from the feeder vessels; and a shutter which is movable to open and close the lower opening of the tablet reserving member, whereby when setting the tablet vessel beneath the tablet reserving member and moving the shutter to open the lower opening of the tablet reserving member, the tablets contained in the tablet reserving member are fed into the tablet vessel, the apparatus further comprising:

a LED "(Light Emitting Diode)" which is turned on when the tablets are fed to the tablet reserving member; and a sensor for detecting opening or closing operation of the shutter; whereby when the sensor detects the opening operation of the shutter, the LED is turned off.

According to the present invention, turning on of the LED allows an operator to recognize at a glance from which tablet feeding section are discharged the tablets. When setting the tablet vessel beneath the tablet reserving member to open the shutter, the tablets in the tablet reserving member are fed into the tablet vessel and the LED is turned off. Thus, it can be confirmed that the tablets are fed into the tablet vessel from the tablet reserving member and also it is possible to discharge next tablets into the tablet reserving member.

It is preferable that after the tablets are discharged in the tablet reserving member and the LED is turned on, the tablets can not be fed from the mounting base unless the opened condition and subsequent closed condition of the shutter is detected by the sensor. Thus, there is no risk that next tablets are mixed into tablets previously discharged, whereby the feed of the tablets can be constantly properly conducted.

The present invention also provides a tablet packing apparatus, the apparatus comprising:

a plurality of feeder vessels containing the tablets;

a plurality of mounting bases on which respective feeder vessels are mounted;

a tablet reserving member disposed below the mounting base, the tablet reserving member reserving the tablets fed from the feeder vessels; and a shutter which is movable to open and close the lower opening of the tablet reserving member, whereby when setting the tablet vessel beneath the tablet reserving member and moving the shutter to open the lower opening of the tablet reserving member, the tablets contained in the tablet reserving member are fed into the tablet vessel, wherein after the tablets are discharged in the tablet reserving member, the tablets can not be fed from the mounting base unless the opened condition and subsequent closed condition of the shutter is detected by the sensor.

It is preferable that the shutter is urged so as to close the lower opening of the tablet reserving member, whereby when engaging the tablet vessel with the shutter to push the shutter against an urged force, the lower opening of the tablet reserving member is opened. Thus, the shutter can be easily opened.

It is preferable that the shutter is formed with an arc-like cutout portion with which the tablet vessel engages. Thus, the tablet vessel can be engaged with the shutter to easily push the shutter.

BRIEF DESCRIPTION OF THE DRAWINGS

Other objects and features of the present invention will become clear from the following detailed description with reference to the accompanying drawings in which.

DETAILED DESCRIPTION OF THE PREFERRED EMBODIMENTS

Figure 1:
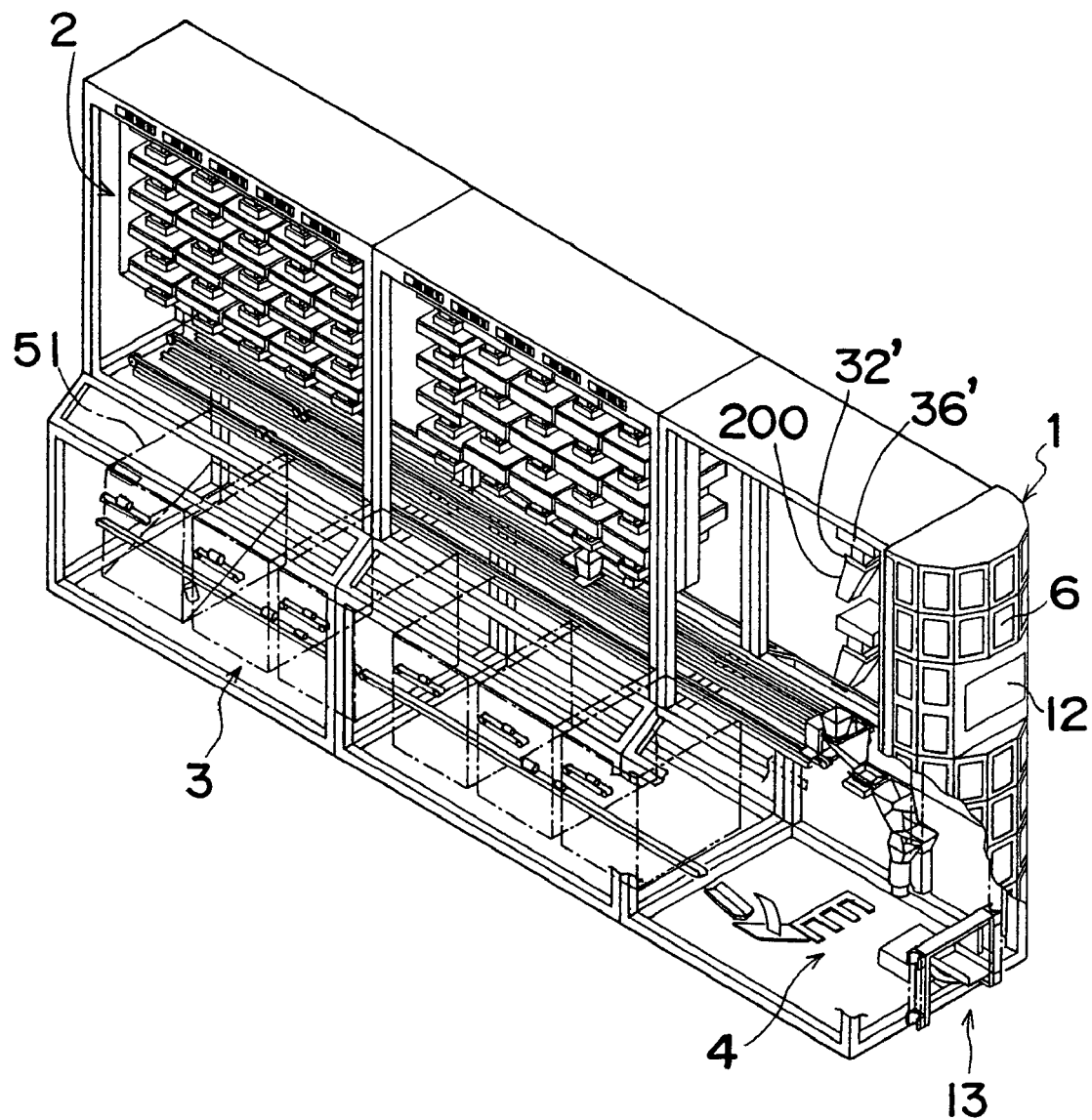
FIG. 1 is a perspective overall view illustrating a tablet packing apparatus in accordance with the invention.

FIG. 1 shows a tablet packing apparatus in accordance with the invention. The apparatus generally comprises storage shelves 1 provided on one end side of the apparatus, a tablet feeding section 2 provided in the upper part of the apparatus, tablet vessel feeding sections 3 provided under the tablet feeding section 2, a tablet packing section 4 provided between the storage shelves 1 and the tablet vessel feeding sections 3, and a controlling section 5 (see FIG. 17).

Figure 2A:
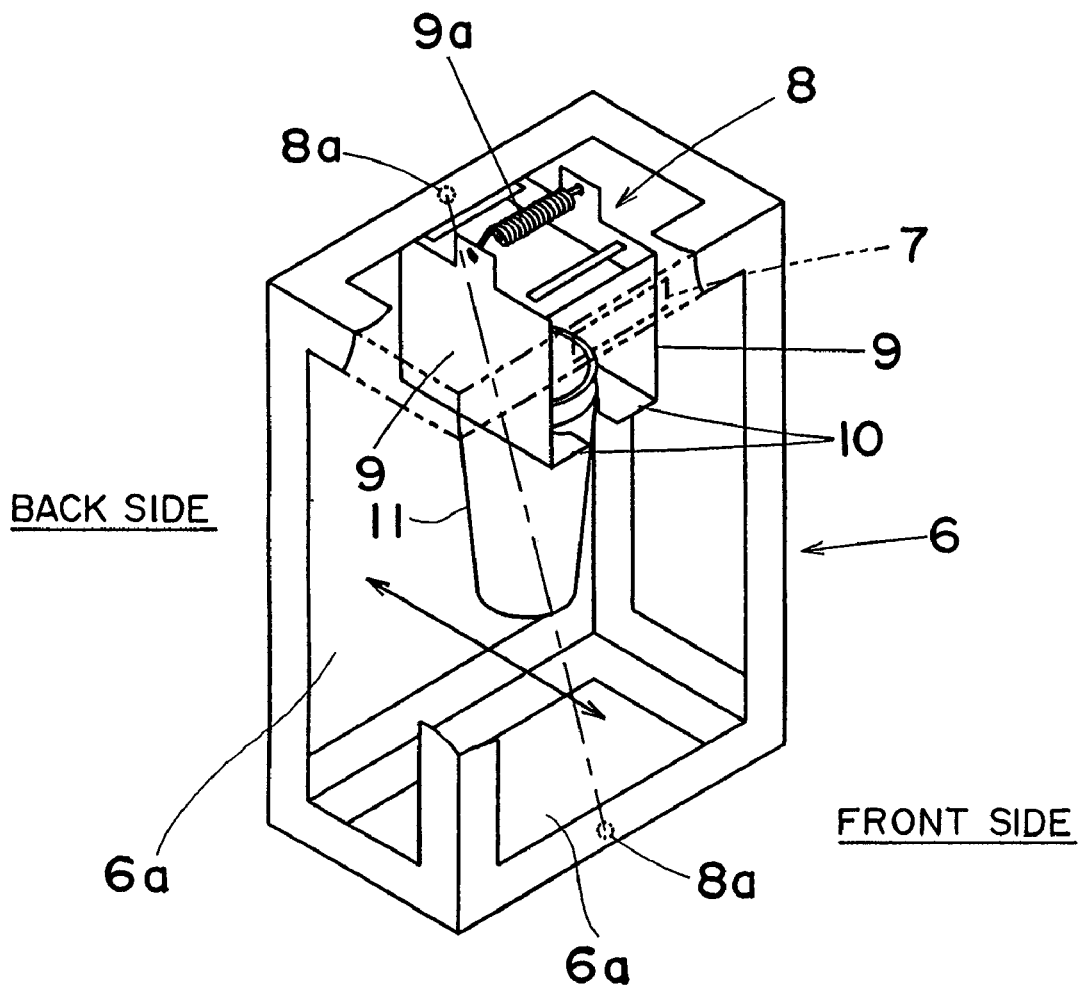
FIG. 2A is a perspective view illustrating a container chamber held in storage shelves in FIG. 1.

The storage shelves 1 have a generally semi-cylindrical shape and includes a plurality of container chambers 6. As shown in FIG. 2A, each container chamber 6 has a rectangular frame body in which at least the surfaces opposed in the direction shown by an arrow in FIG. 2A have openings. The openings are closed with doors 6a biased by means of unshown springs or so. The doors 6a can be opened toward the front surface side, preventing one's hand from being inserted into a packed vessel conveyor 13 that will be explained hereinafter. The doors 6a can be pivoted within a range that does not interfere with a tablet vessel 11 held by a vessel holder 8 that will be explained hereinafter. A display 7 is provided on the upper part of the front side of the container chamber 6. In the embodiment, the feeder vessel number and the tablet count number are displayed on the display 7. The container chamber 6 is also provided with a vessel holder 8. In the vessel holder 8, a pair of holding plates 9 are opposed to each other in a horizontal direction.

Figure 2B:
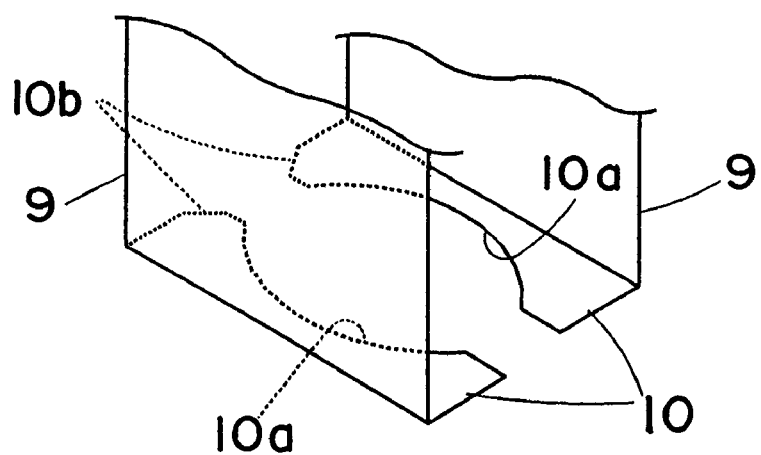
FIG. 2B is a fragmentary perspective view in FIG. 2A.

The holding plates 9 are biased by a spring 9a in the direction in which the holding plates 9 come close to each other. At the lower ends of the holding plates 9 are formed holding lugs 10 which extend in the direction in which the holding plates 9 are opposed. As shown in FIG. 2B, on opposed edges of the holding lugs 10 are formed recesses 10a which have a generally elliptic shape so as to hold a tablet vessel 11. At the back side corners of the holding lugs 10 are formed cutouts 10b which are spread out toward the inside. The cutouts 10b are provided to facilitate the insertion of the tablet vessel 11 into the recesses 10a. A vessel sensor 8a is capable of detecting whether the tablet vessel 11 is held by the vessel holder 8 in the container chamber 6 or not.

As shown in FIG. 1, in the center part of the outer circumference of the storage shelves 1 is provided a touch panel 12, instead of the container chamber 6. The touch panel 12 is provided to allow instruction data on the prescription to be inputted directly.

Figure 3:
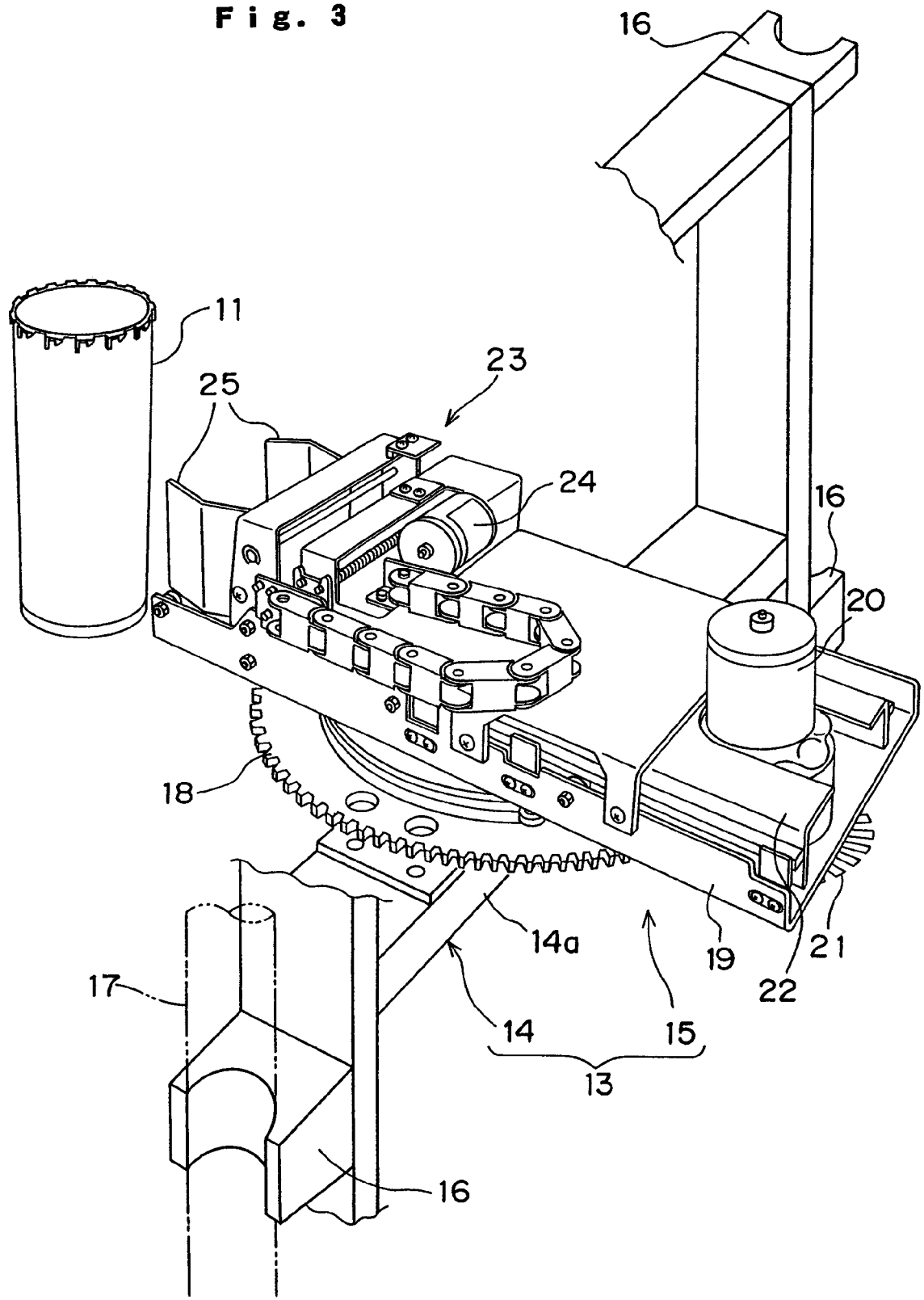
FIG. 3 is a perspective view illustrating an arm member in FIG. 1.

Inside the storage shelves 1 is provided a conveyor 13 for packed vessel. In the conveyor 13 for packed vessel, as shown in FIG. 3, an arm member 15 is pivotally mounted to a rectangular frame 14 which is capable of traveling vertically.

A bearing recess 16 is provided at each of the upper and lower ends of both outside surfaces of the rectangular frame 14. The bearing recesses 16 are in sliding contact with guide shafts 17 standing at a given interval behind the storage shelves 1. The conveyor 13 for packed vessel can be moved vertically through the medium of a belt (not shown) by the driving of a motor (not shown). A first driving gear 18 is fixed to the center of the lower horizontal plate 14a of the rectangular frame 14. Instead of the bearing recess 16, a roller or a bearing that comes into slide contact with the guide shaft 17 can be used.

The arm member 15 comprises an arm body 19 mounted rotatably on the center shaft of the first driving gear 18. A first driving motor 20 is provided on one end portion of the arm body 19. To the rotating shaft of the first driving motor 20 which protrudes from the bottom surface of the arm body 19 are fixed position detection plates 21 and a second driving gear (not shown) engaged with the first driving gear 18. A rotational position of the second driving gear can be determined by the detection of the position detection plates 21 by a sensor (not shown). With this arrangement, the arm member 15 is rotated in forward or reverse direction in the range of 180° by the drive of the first driving motor 20. On the top surface of the arm body 19 is provided a sliding member 22 which is driven by a built-in, second driving motor (not shown) and thereby reciprocates in the longitudinal direction. On one end portion of the sliding member 22 (on the side opposite to the first driving motor 20) is provided a gripping member 23. The gripping member 23 comprises a pair of gripping pieces 25 which are driven through a gear not shown by a third driving motor 24 provided on the sliding member 22 and thereby open and close.

The third driving motor 24 is driven and stopped based on an electric current value that fluctuates due to a difference of load applied on the gripping pieces 25. Concretely, when the load of the third driving motor 24 increases at the time of griping and releasing the tablet vessel 11 and then the electric current value exceeds a threshold value (obtained by adding a margin electric current to an electric current value at the normal operation), the third driving motor 24 is stopped. The increase of the load at the time of releasing the tablet vessel 11 is caused by allowing the gripping pieces 25 to come into contact with a stopper (not shown) at a predetermined open position. The gripping pieces 25 are urged toward the open position by an unshown spring or so in order to absorb the backlash of the gear.

The tablet feeding section 2 comprises a tablet container section 26 and a tablet conveyor section 27.

Figure 4:
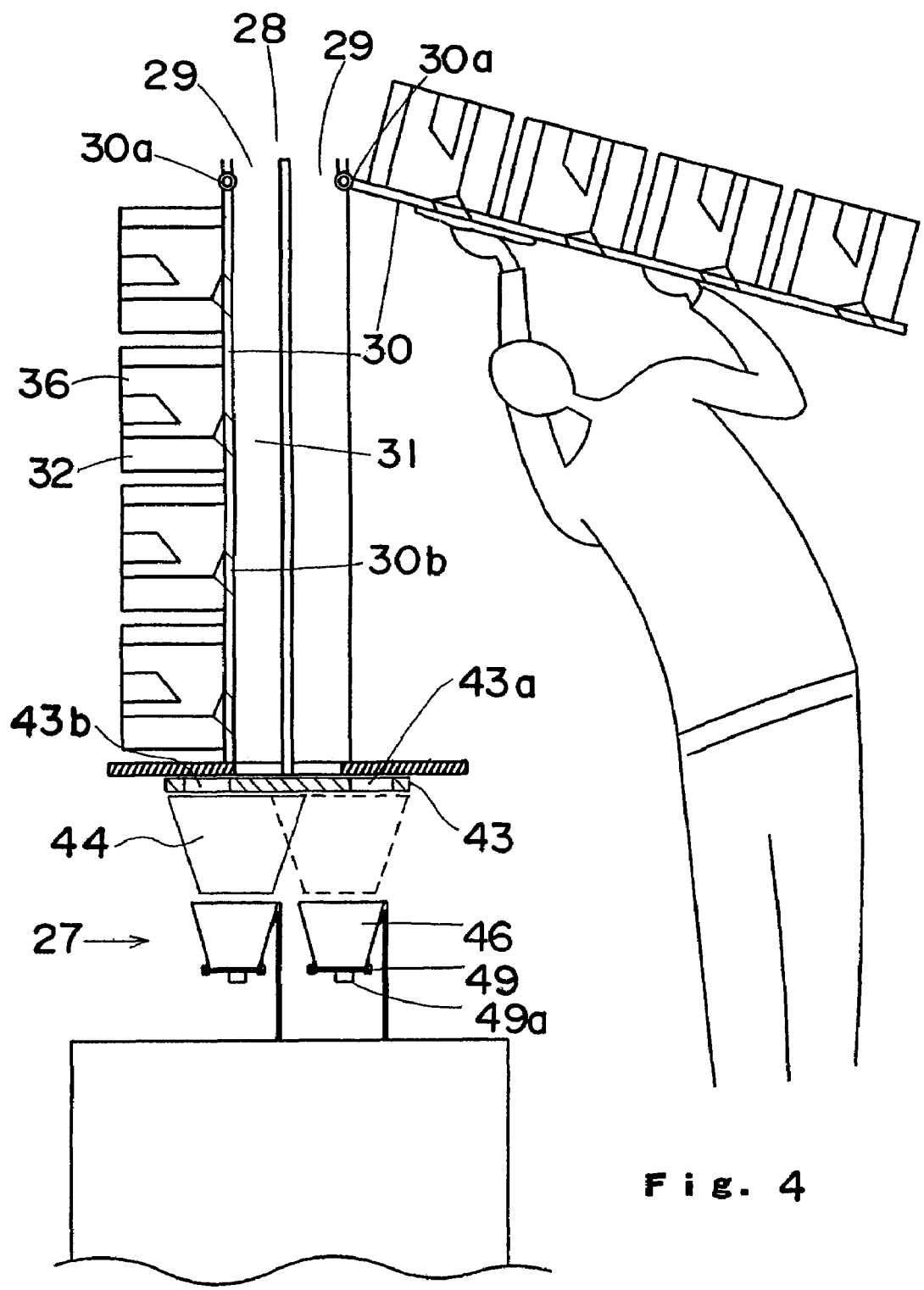
FIG. 4 is a sectional view illustrating a tablet container section in FIG. 1.

In the tablet container section 26, as partly shown in FIG. 4, grooves 29 extending vertically are provided on both sides of a vertical wall 28. Each groove 29 is covered with a shelf member 30 provided pivotably about a pivot 30a so that common guide paths 31 are formed. A plurality of openings 30b for discharging tablets are provided in a vertical line on each shelf member 30. A plurality of motor bases 32 corresponding to the openings 30b for discharging tablets are mounted to the outer surface of each shelf member 30.

Figure 5A:
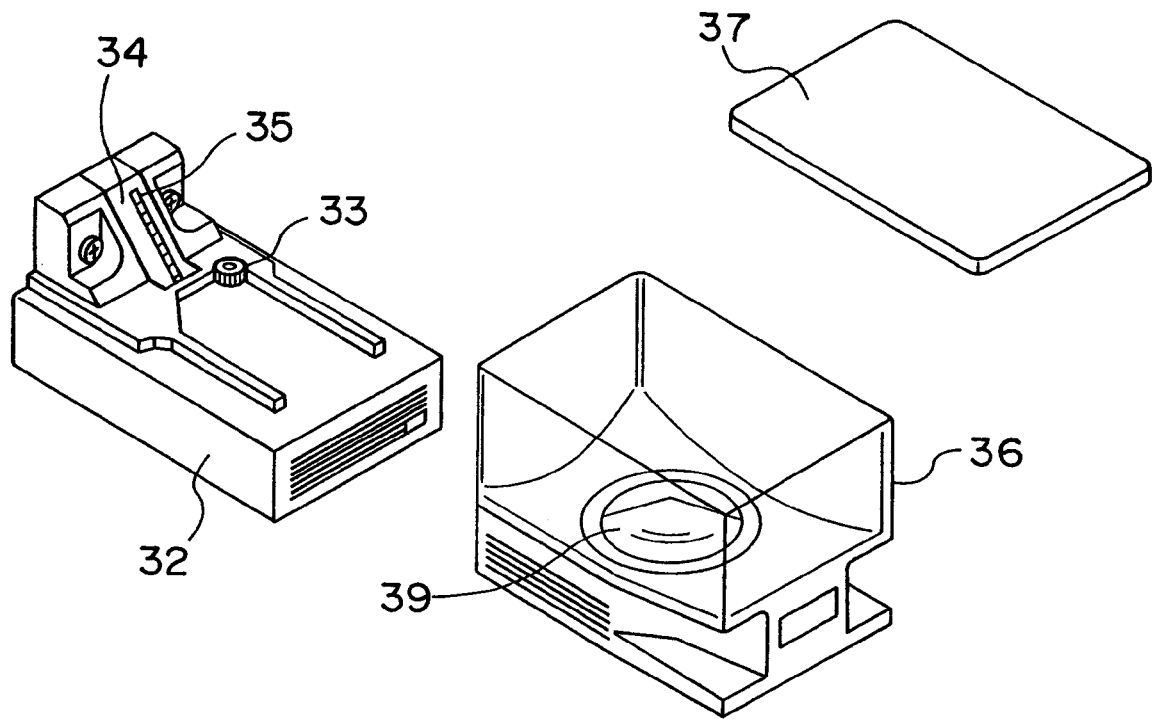
FIG. 5A is an exploded perspective view illustrating a motor base and a feeder vessel in FIG. 4.
Figure 6A:
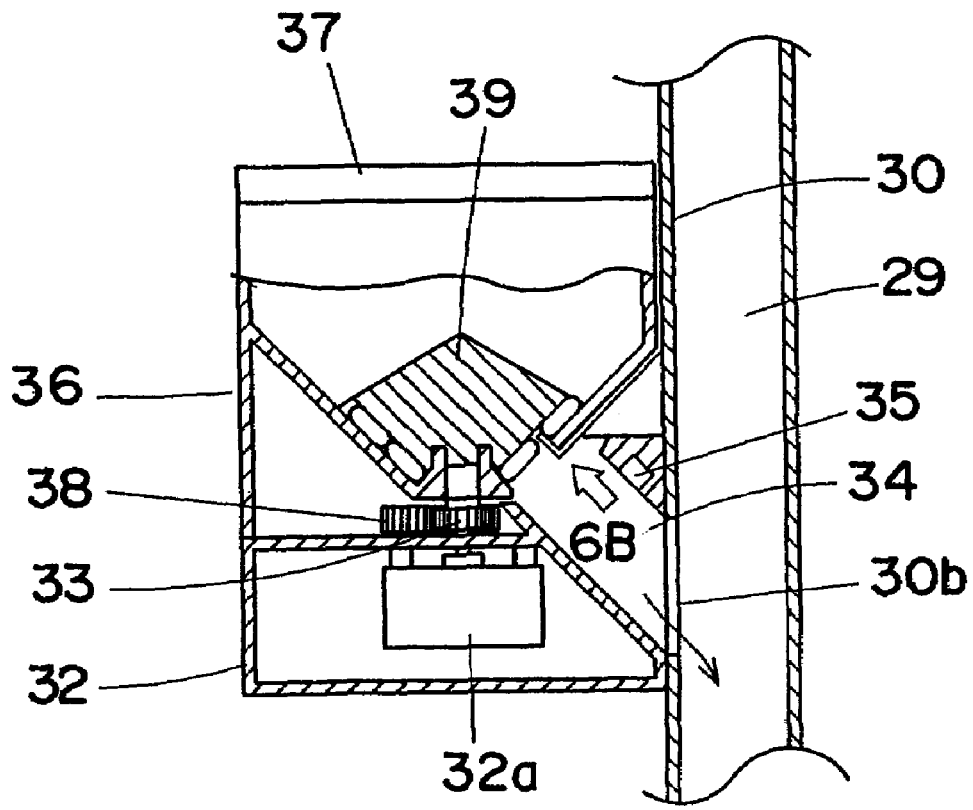
FIG. 6A is a sectional view illustrating the motor base and the feeder vessel in FIG. 4.

As shown in FIGS. 5A and 6A, each motor base 32 has a built-in driving motor 32a. A driving gear 33 to which the power from the driving motor 32a is transferred is exposed on the top surface of the motor base 32. A fall guide path 34 is formed on one end side of the motor base 32. A tablet detecting sensor 35 is provided on the inner wall of the fall guide path 34, so that the tablets discharged through the fall guide path 34 can be detected (counted).

A feeder vessel 36 is detachably mounted to the motor base 32. The feeder vessel 36 is generally in the shape of a rectangle which opens upward and which can be covered with a cover 37. In the feeder vessel 36 is stored tablets. At the bottom of the feeder vessel 36 is provided a rotor 39 having a gear 38 at the lower end thereof.

Figure 6B:
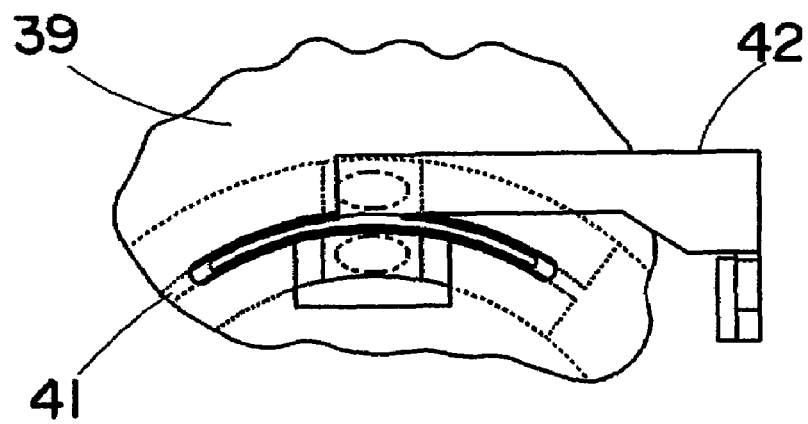
FIG. 6B is a fragmentary view illustrating a dividing fin in FIG. 6A.
Figure 7A:
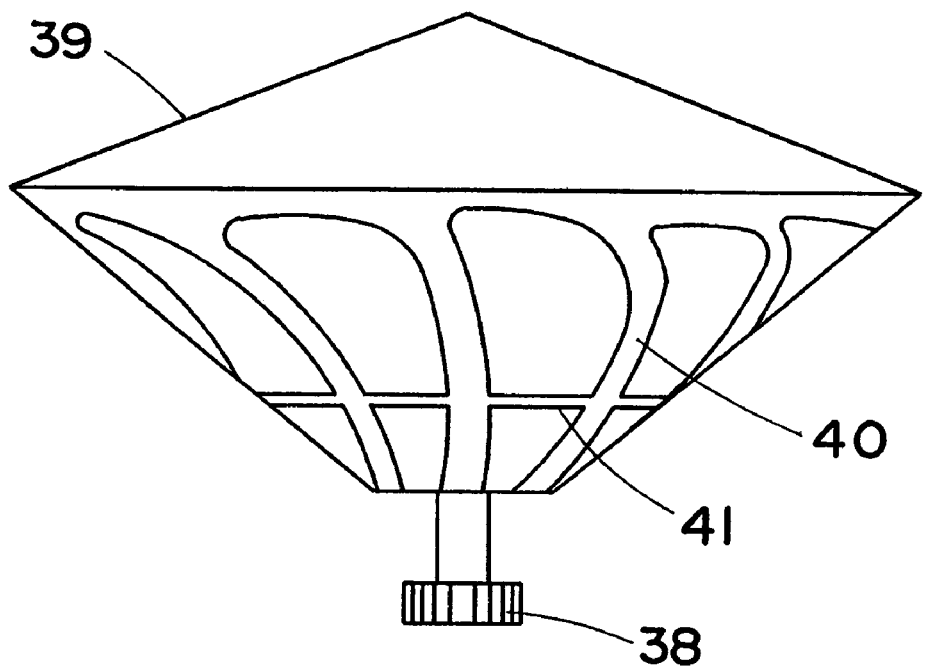
FIG. 7A is a front view illustrating a rotor provided in a feeder vessel in FIG. 4.
Figure 7B:
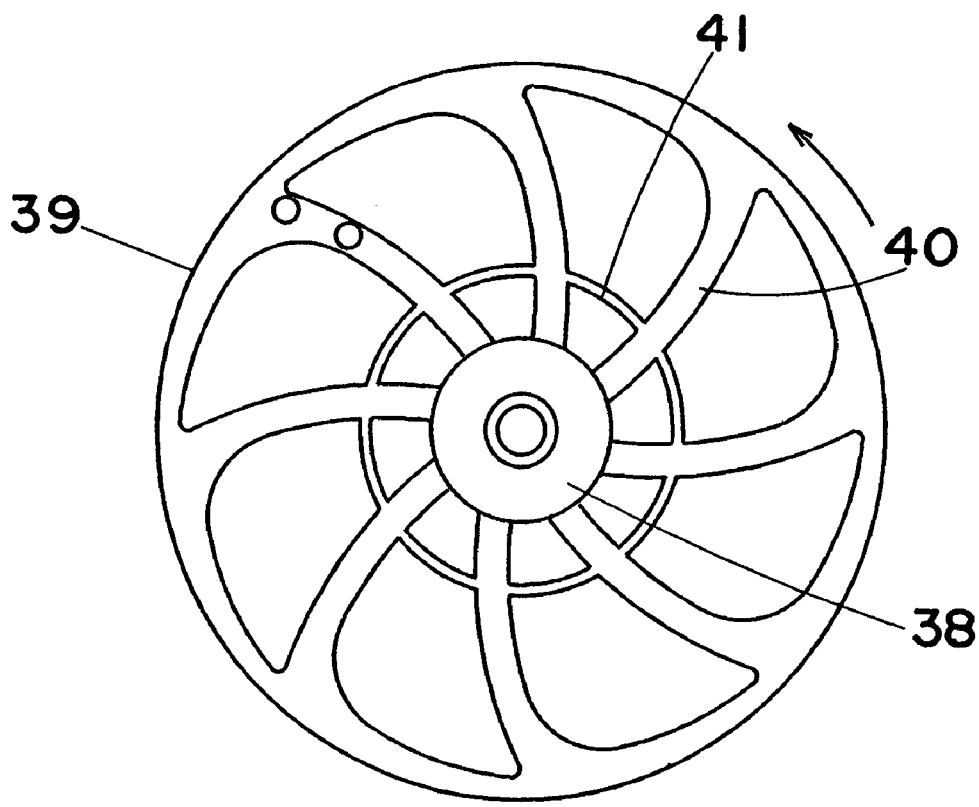
FIG. 7B is a bottom view illustrating the rotor in FIG. 7A.

As shown in FIGS. 7A and 7B, the rotor 39 has conical surfaces on its upper and lower parts. The attachment of the feeder vessel 36 to the motor base 32 engages the gear 38 with the gear 33 on the motor base 32. On the lower conical surface of the rotor 39 are formed tablet guiding grooves 40 extending spirally toward the center of the surface, and are formed dividing grooves 41 dividing each tablet guiding groove 40 into two parts in the middle thereof. The spiral direction of the tablet guiding grooves 40 toward the center of rotation of the rotor 39 is opposite to the direction of rotation of the rotor 39 (opposite to the direction shown in the arrow in FIG. 7B). In the dividing grooves 41 is provided a dividing fin 42. With the rotation of the rotor 39 as shown in FIG. 6B, the dividing fin 42 divides the line of tablets that pass through the tablet guiding grooves 40.

Figure 5B:
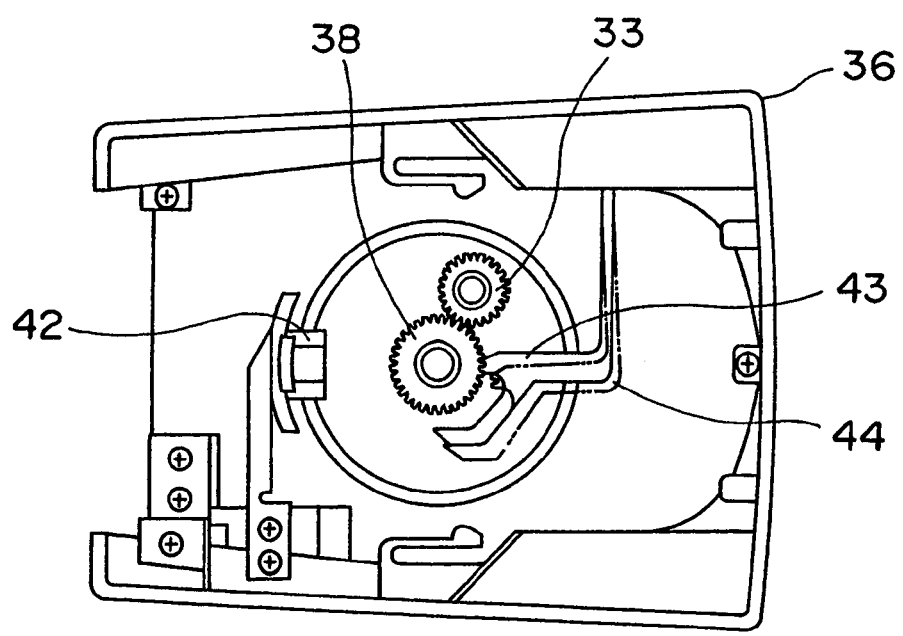
FIG. 5B is a bottom view illustrating the feeder vessel in FIG. 5A.

As shown in FIG. 5B, a gear stopper 43 is capable of engaging with the gear 38 in the feeder vessel 36 when the feeder vessel 36 is detached from the motor base 32 and disengaged to the gear 38 when the feeder vessel 36 is mounted. The gear stopper 43 is biased against the gear 38 by a stopper spring 44. Even though the feeder vessel 36 is detached from the motor base 32, the above arrangement allows the gear stopper 43 to engage with the gear 38 and prevents the rotor 39 from rotating, so that tablets cannot fall out of the feeder vessel 36.

In the tablet feeding section 2, when the driving motor 32a in the motor base 32 is driven with the feeder vessel 36 attached to the motor base 32, the rotor 39 is rotated through the medium of the gear 33 and of the driving gear 38, thereby tablets move in a line toward the center of rotation, forming a line for each tablet guiding groove 40. As mentioned above, the tablet guiding grooves 40 are formed so as to extend spirally toward the center of rotation of the rotor 39 in the direction opposite to the direction of rotation of the rotor 39. Tablets are therefore forced to move toward the center of rotation regardless of the centrifugal forces exerted on the tablets by the rotation of the rotor 39. The line of tablets is divided by the dividing fin 42 before each tablet guiding grooves 40 communicates with the fall guide path 34, and then fall one by one into the common guide path 31 through the fall guide path 34.

As shown in FIG. 4, at the lower ends of the common guide paths 31 are provided a shutter 43 for temporarily retaining the tablets which have fallen from the fall guide path 34. The shutter 43 comprises a single plate which can horizontally slide across the common guide paths 31. At the both end portions of the shutter 43, openings 43a, 43b are formed. When the shutter 43 slides toward the left side, the right common guide path 31 is opened by the right opening 43a. When the shutter 43 slides toward the right side, the left common guide path 31 is opened by the left opening 43b. When the shutter stops at the middle point of the slide stroke, the both of the common guide paths 31 are closed.

Beneath the shutter 43, a hopper 44 is slidably and detachably disposed. Along with the slide operation of the shutter 43, the hopper 44 can slide to a position where the hopper 44 can receive the tablets. Thus, the tablets received through the common guide paths 31 can be fed to respective conveyor vessels 46 in the tablet conveyor section 27 disposed beneath the hopper 44.

Figure 11:
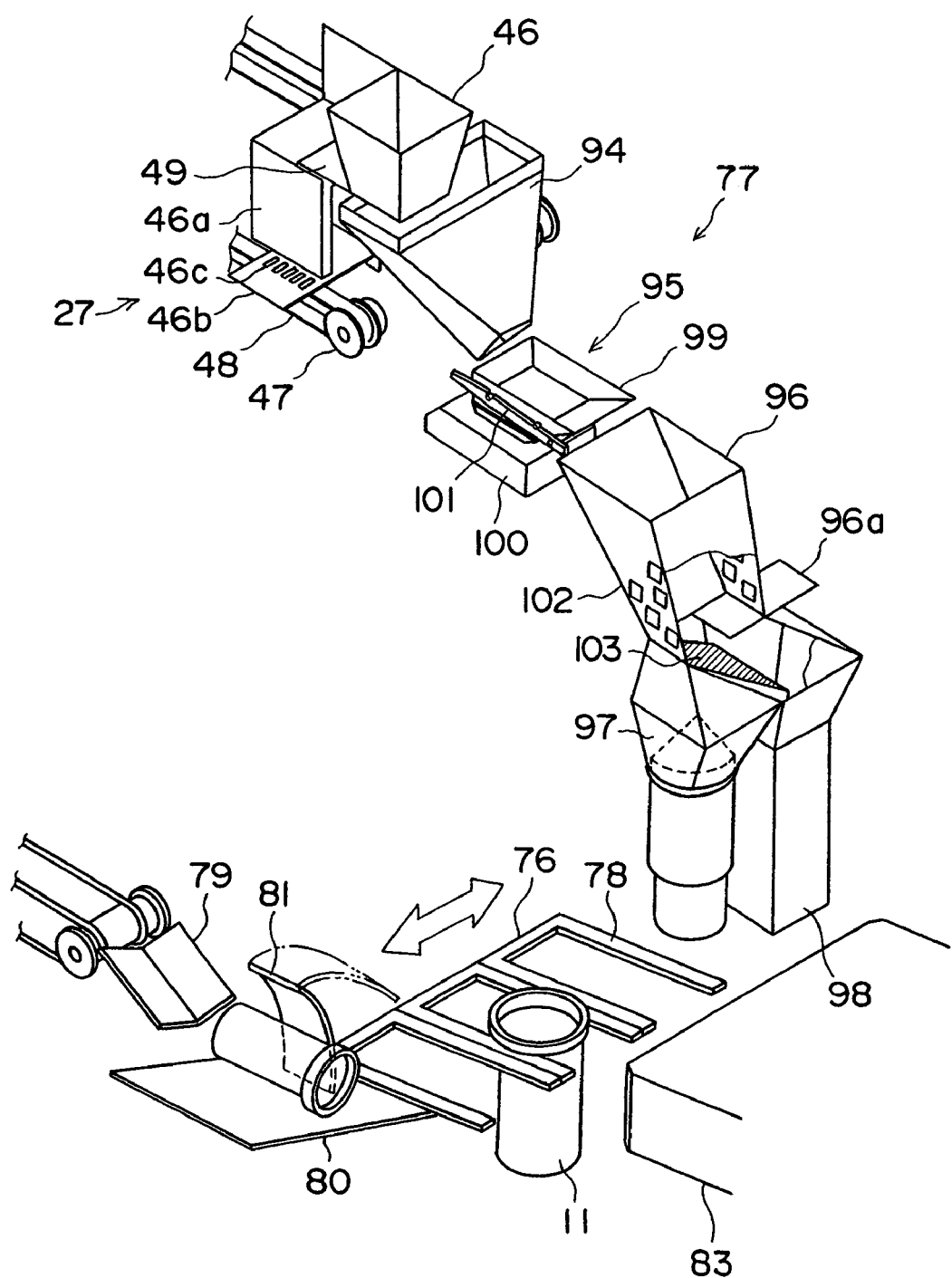
FIG. 11 is a fragmentary perspective view illustrating the vicinity of a tablet packing section in FIG. 1.
Figure 15A:
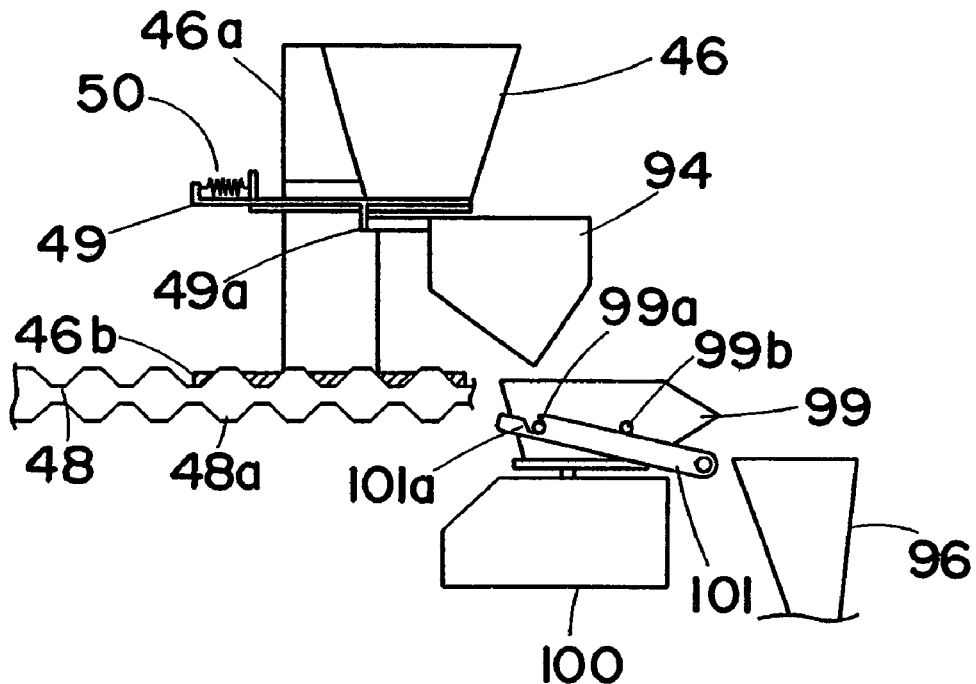
FIGS. 15A and 15B are front views illustrating the operation of a tablet weighing section in FIG. 11.
Figure 15B:
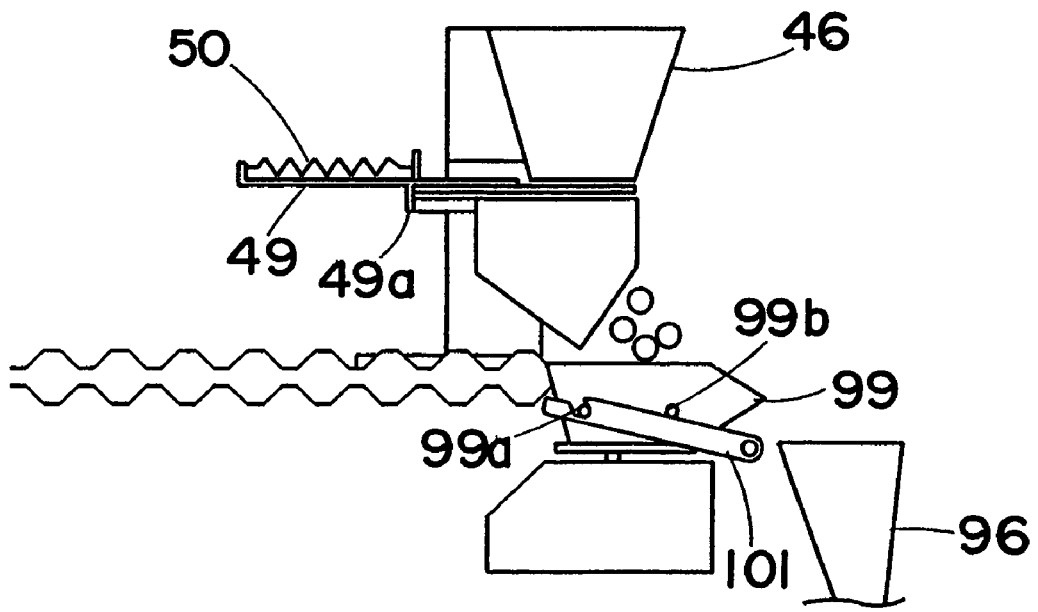

The tablet conveyor section 27, as shown in FIG. 11, comprises two lines of conveyor belts 48 and conveyor vessels 46. The conveyor belts 48 are looped between a pair of pulleys 47. The conveyor vessels 46 are supported on the conveyor belts 48 by a support frame 46a so as to be reciprocated. Rectangular apertures 46c are provided in a line on a bottom plate 46b of the support frame 46a (see FIGS. 11 and 15). The conveyor belt 48 has continual guide projections 48a, which engage with the rectangular apertures 46c to allow the conveyor vessel 46 to be moved. The bottom of the conveyor vessel 46 comprises a shutter 49 which can be opened and closed. The shutter 49 is biased, as shown in FIG. 15, by a spring 50 provided at one end of the shutter 49 so as to shut the bottom of the conveyor vessel 46. A protrusion 49a is formed at one end on the downside surface of the shutter 49.

Figure 8:
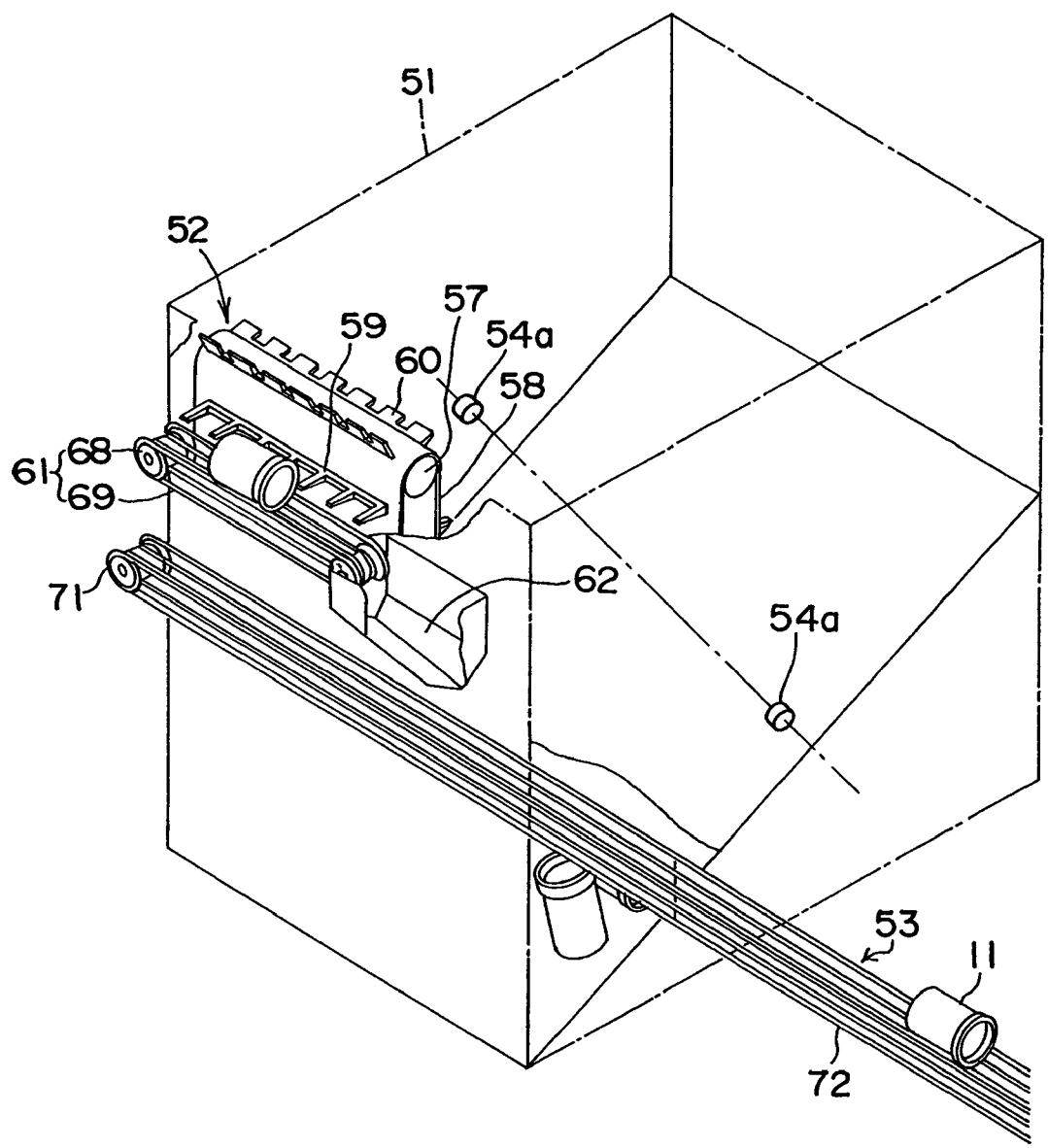
FIG. 8 is a perspective view illustrating a stock container in FIG. 1.
Figure 9:
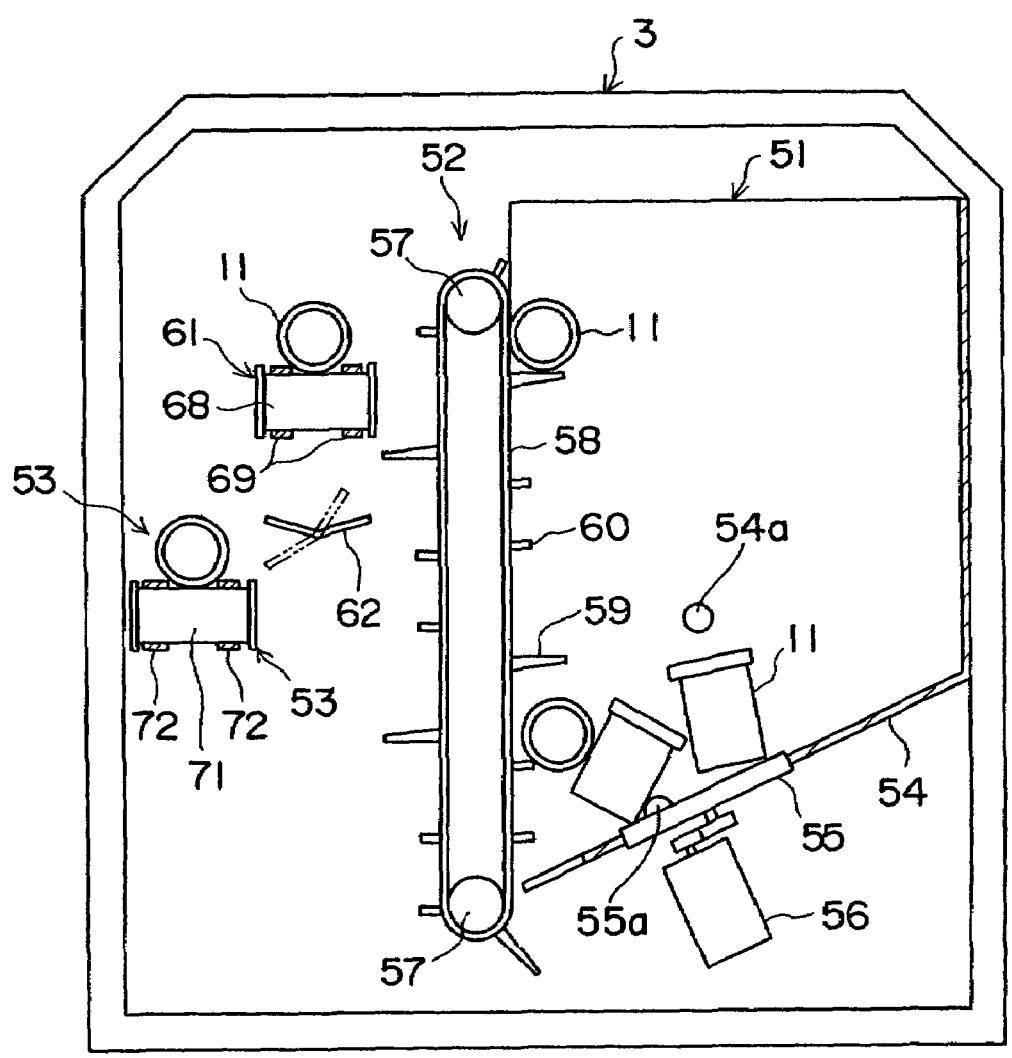
FIG. 9 is a sectional view of FIG. 8.

As shown in FIGS. 8 and 9, each tablet vessel feeding section 3 comprises a stock container 51 for storing empty tablet vessels 11, a vessel takeout section 52 for taking out tablet vessels 11 one by one from the stock container 51, and an empty vessel conveyor 53 for conveying the tablet vessel 11 taken out from the stock container 51 by the vessel takeout section 52. The tablet vessel feeding sections 3 are disposed in a line as shown in FIG. 1. The sizes (outside diameters or lengths) of empty tablet vessels 11 stored in the stock containers 51 are different for each stock container 51.

Figure 12:
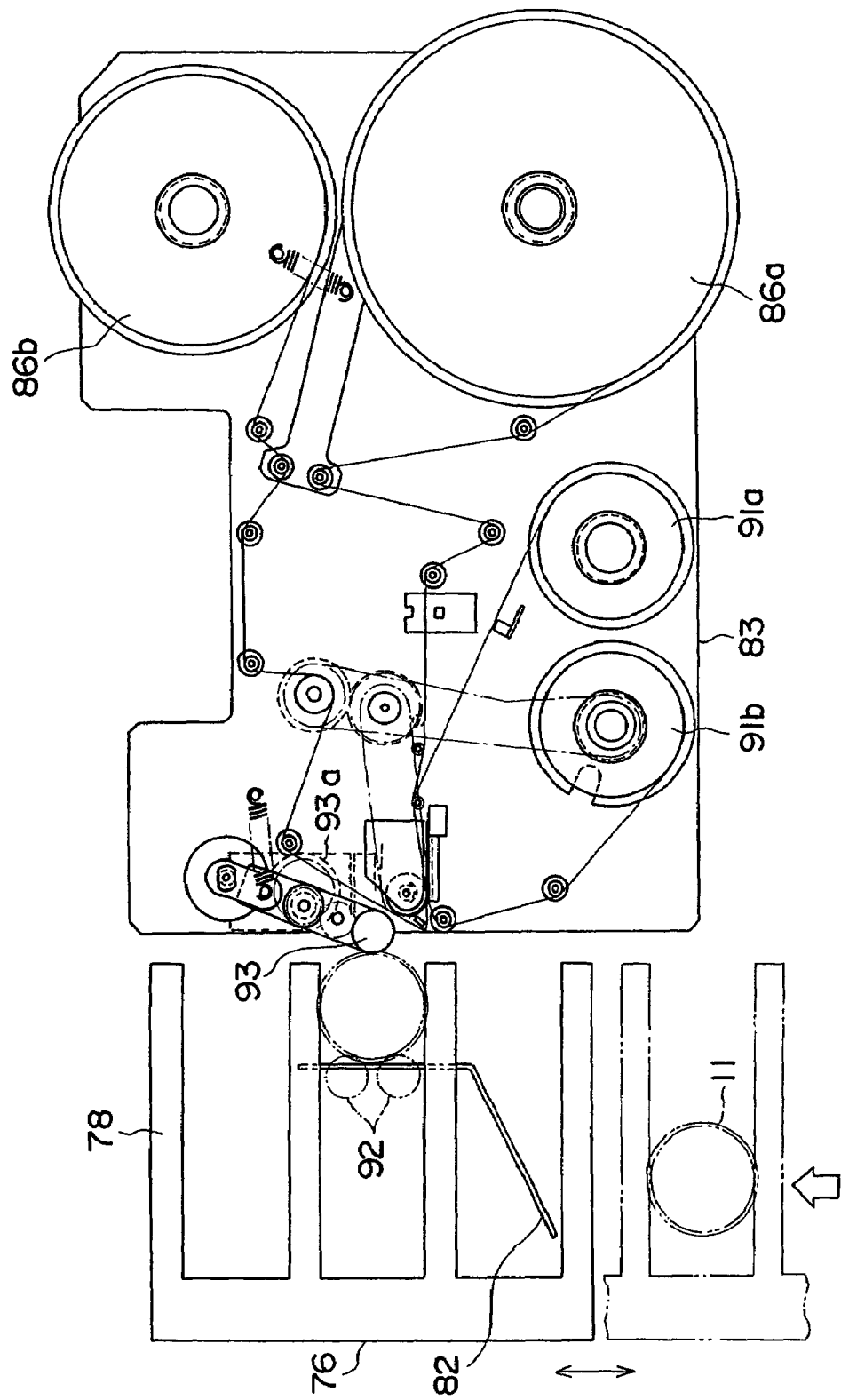
FIG. 12 is a plan view illustrating a vessel support portion and a label fitting apparatus in FIG. 11.
Figure 13:
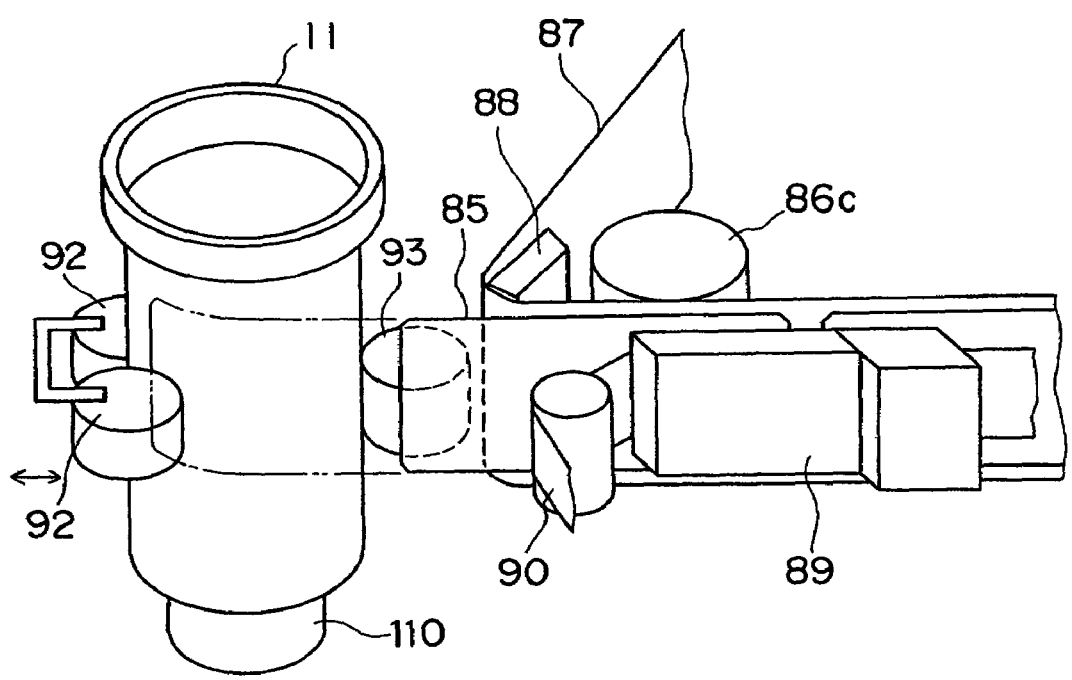
FIG. 13 is a partly enlarged perspective view of FIG. 12.

The bottom wall 54 of the stock container 51 is inclined downwardly toward the vessel takeout section 52 and is provided with a rotation plate 55 in the vicinity of the vessel takeout section 52. The rotation plate 55 slightly protrudes from the bottom wall 54. The rotation plate 55 is periodically rotated both forward and backward by a motor 56 so that the inclined direction of the tablet vessels 11 with respect to the vessel takeout section 52 can be changed. On the upper surface of the rotation plate 55, a semi-spherical shape of protrusion 55a is formed. The protrusion 55a allows the tablet vessel 11 to change its position lateral and assists in taking out of the tablet vessel 11 by the vessel takeout section 52. Transmission types of photo sensors 54a are provided above the inclined bottom wall 54. Indication lamps (not shown) provided on the stock container 51 indicate the remaining quantity of the tablet vessels 11 based on the detected signal of the photo sensors 54a. Namely, "F" lamp is ON when light between the photo sensors 54a is intercepted, while "L" lamp is ON when light between the photo sensors 54a is not intercepted. Moreover, "E" lamp is ON when a sensor provided on a conveyor 61 or a delivery table 62 which will be described hereinafter does not detect the tablet vessel 11 for a predetermined time. Alternatively, the remaining quantity of the tablet vessels 11 may be indicated on the touch panel 12 as shown in FIG. 12

Figure 10:
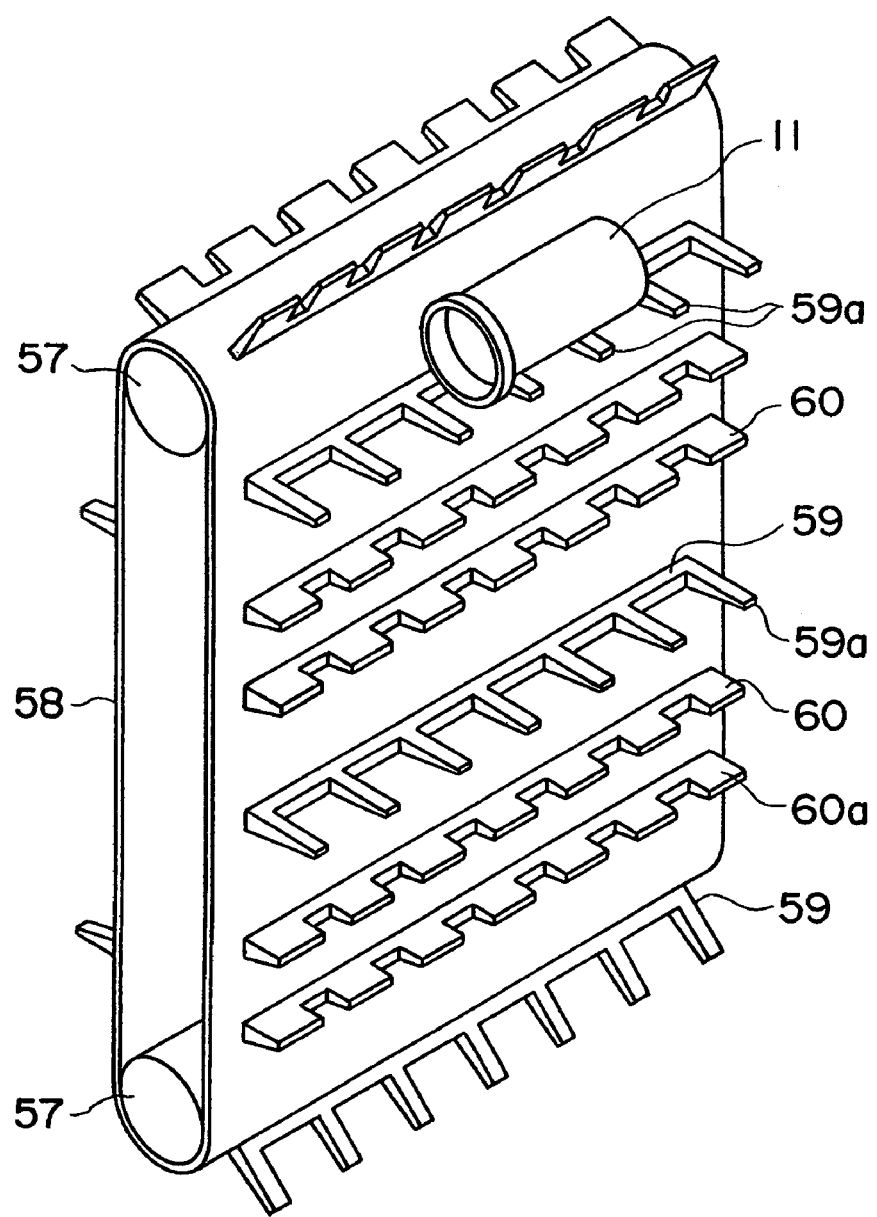
FIG. 10 is a perspective view illustrating a vessel taking out portion in FIG. 8.

The vessel takeout section 52, as shown in FIG. 10, comprises rollers 57 juxtaposed vertically and a belt 58 running between the rollers 57. On the belt 58, lateral vessel holding portions 59 are provided at a predetermined distance along the running direction. Between the lateral vessel holding portions 59, two vertical vessel eliminating portions 60 are provided. Each lateral vessel holding portion 59 comprises a plurality of holding fingers 59a protruding with a predetermined distance. Each vertical vessel eliminating portion 60 comprises a plurality of projections 60a protruding with a predetermined distance. The distance between the lateral vessel holding portions 59 is smaller than the height of the tablet vessel 11 and larger than the outside diameter of the tablet vessel 11. The distance between the holding fingers 59a is larger than the outside diameter of the tablet vessel 11. Thus, the lateral vessel holding portions 59 can surely hold the tablet vessel 11 laterally without engaging the open edge of the tablet vessel 11 with the holding fingers 59a.

The vessel takeout section 52 further comprises a conveyor 61 and a delivery table 62 for conveying the tablet vessels 11 taken out by the vessel takeout section 52 to the empty vessel conveyor 53. The conveyor 61 comprises a pair of rollers 68 and four conveyor ropes 69 running between the rollers 68. The roller 68 is driven to rotate both forward and backward by a motor not shown. The distance between the conveyor ropes 69 is smaller than the outside diameter of the tablet vessel 11. The delivery table 62 has a substantially L shaped section and is pivotable between positions as shown in solid line and two dots chain line respectively in FIG. 9 to deliver the tablet vessels 11 conveyed by the conveyor 61 to the empty vessel conveyor 53. The vessel takeout section 52 is operated when no tablet vessel 11 is detected on the conveyor 61 or delivery table 62 by a sensor not shown for a predetermined time. The empty vessel conveyor 53 is operated in a reverse conveying direction for a predetermined time at the time of power ON initially and after emergency stop. If the empty tablet vessel 11 is present on the way of the empty vessel conveyor 53, the empty tablet vessel 11 is recovered into a recovery box not shown disposed on one end of the empty vessel conveyor 53, namely on the end opposite to the tablet packing section 4.

The empty vessel conveyor 53 is provided below the delivery table 62 along the stock containers 51 arranged in line. In the same manner as the conveyor 61, the empty vessel conveyor 53 comprises a pair of pulleys 71 and a pair of conveyor ropes 72 looped between the pair of pulleys 71.

As shown in FIG. 11, the tablet packing section 4 comprises a fork-like vessel holder section 76 and a tablet weighing section 77.

The vessel holder section 76 has a plurality of support pieces 78 between which the tablet vessel 11 can be supported. The distance between the support pieces 78 corresponds to the size of the tablet vessels 11. In the present embodiment, the vessel holder section 76 can hold S, M and L sizes of the tablet vessels 11. The vessel holder section 76 can reciprocate between a vessel receiving position and a tablet receiving position by means of drive unit not shown.

In the vicinity of the vessel receiving position, first, second and third guide plates 79, 80 and 81 are disposed.

The first guide plate 79 has a substantially V-shape so that the tablet vessel 11 conveyed by the empty vessel conveyor 53 can be delivered to the second guide plate 80. The second guide plate 80 is inclined so that the tablet vessel can roll on the second guide plate 80 toward the vessel holder section 76. The third guide plate 81 can pivot above the second guide plate 80 for allowing or disallowing the tablet vessel 11 to be passed to the vessel holder section 76. The third guide plate 81 may be provided with a delivery guide plate which allows the tablet vessel 11 to surely roll.

Under the vessel holder section 76, a vessel aligning plate 82 is disposed. The vessel aligning plate 82 allows the tablet vessels 11 held by the support pieces 78 to align when the vessel holder section 76 is horizontally moved. Thus, it is possible to reduce push quantity by push rollers 92 which will be described hereinafter, resulting in effective operation.

In the vicinity of the tablet receiving position, there are provided a labeler 83 and a lifter 84.

The labeler 83 is arranged to print a medicine name or so on labels 85 and fix the labels 85 to the tablet vessels 11. The labels 85 are in advance stuck to a sheet 87 wound on one roller 86a and released from the sheet 87 when the sheet 87 is turned at a guide tip 88. The sheet 87 with the labels 85 released is rewound on the other roller 86b. Printing to the labels 85 is carried out before releasing the labels 85 from the sheet 87 in such a manner that printing, information is heat transferred through a ribbon 90 by means of printing head 89 as the sheet 87 is supported with a backing roller 86c. The ribbon 90 is fed from one roller 91a and rewound on the other roller 91b.

Under the vessel holder section 76, a pair of push rollers 92 and a guide roller 93 are disposed. A size detecting sensor (not shown) for detecting the size of the tablet vessels 11 is provided between the push rollers 92. The push rollers 92 are arranged to push the tablet vessel 11 aligned by the vessel aligning plate 82 in a protruding direction of the support pieces 78, whereby holding the tablet vessel 11 together with the guide roller 93 positioned on the other side. Beneath the tablet vessel 11 held by the push rollers 92 and the guide roller 93, a rotation bearing table 110 is disposed. The rotation bearing table 110 can be raised up to a height corresponding to the size of the tablet vessel 11 detected by the size detecting sensor. The guide roller 93 is urged toward the push roller 92 and rotates the tablet vessel 11 due to drive of a motor 93a.

The lifter 84 can lift up the tablet vessel 11 up to a rotation position where a flange portion of the tablet vessel 11 is positioned slightly above the support pieces 78 and a tablet receiving position where the tablet vessel 11 receive the tablets from a packing hopper 97 which will be described hereinafter.

The tablet weighing section 77 comprises an input hopper 94, a weighing section 95, a measuring hopper 96, a packing hopper 97, and a discharging hopper 98.

As shown in FIG. 15, the approach of the conveyor vessel 46 to the input hopper 94 brings the protrusion 49a of the shutter 49 into contact with an edge of the input hopper 94, causing the shutter 49 to open against the bias exerted by the spring 50. This operation allows the tablets accommodated in the conveyor vessel 46 to fall into the input hopper 94.

Figure 16A:
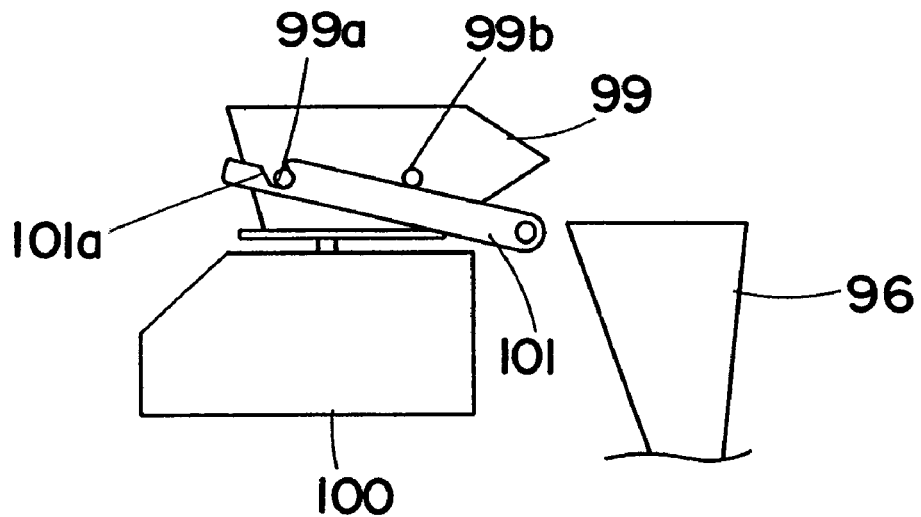
FIGS. 16A, 16B and 16C are front views illustrating the operation of the tablet weighing section in FIG. 11.
Figure 16B:
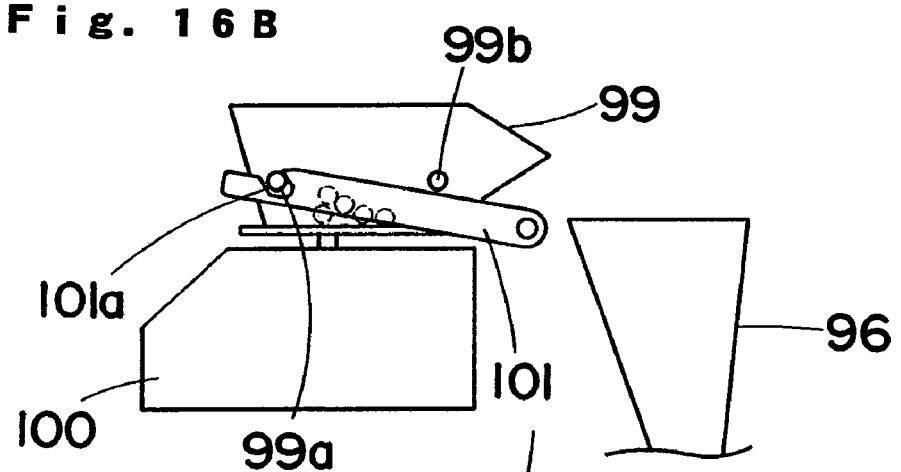
Figure 16C:
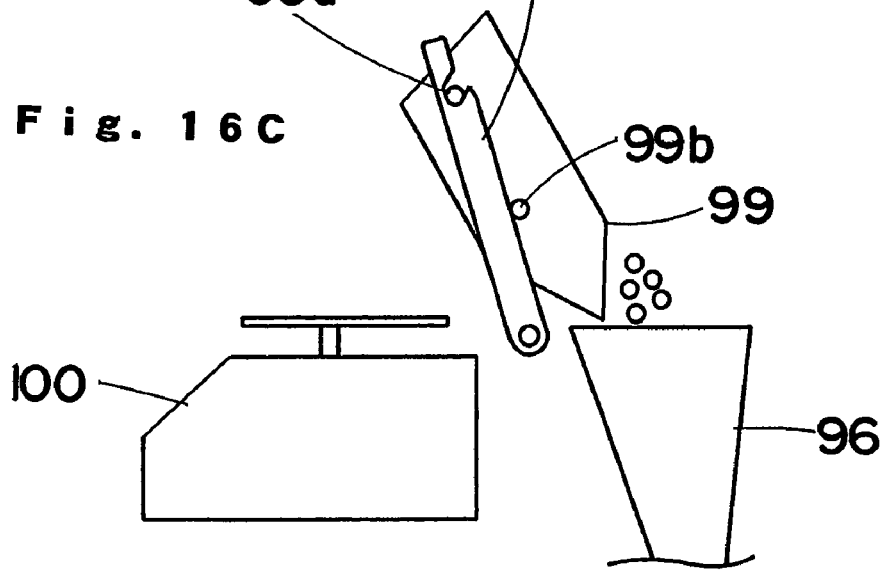

As shown in FIGS. 11 and 15, the weighing section 95 comprises a weighing vessel 99 for accommodating tablets which have fallen from the input hopper 94, a weighing device 100 for weighing the weighing vessel 99 along with the accommodated tablets, and a pair of arms 101 for supporting the weighing vessel 99. Two projections 99a, 99b, as shown in FIG. 16A, are formed on each outside surface on both sides of the weighing vessel 99. At the distal end of each arm 101 is formed an engaging recess 101a which engages with the projection 99a at one end. The engaging recess 101a is so shaped that the projections 99a on the weighing vessel 99 are prevented from falling out when tablets in the weighing vessel 99 are fed into the packing hopper 97 with the pivotal motion of the arms 101. When tablets are fed from the input hopper 94 into the weighing vessel 99, the arms 101 suspend the weighing vessel 99 above the weighing device 100 so that the impulsive force caused by the feeding cannot act directly on the weighing device 100. After the feeding, the arms 101 pivot to load the weighing vessel 99 on the weighing device 100. With this arrangement, the measuring time by the weighing device 100 is shortened.

The bottom surface of the measuring hopper 96 comprises a shutter 96a as shown in FIG. 11. Packing amount detecting sensors 102 are provided on the side surfaces facing each other of the measuring hopper 96, so that the amount of the tablets stocked in the measuring hopper 96 can be determined.

Figure 14:
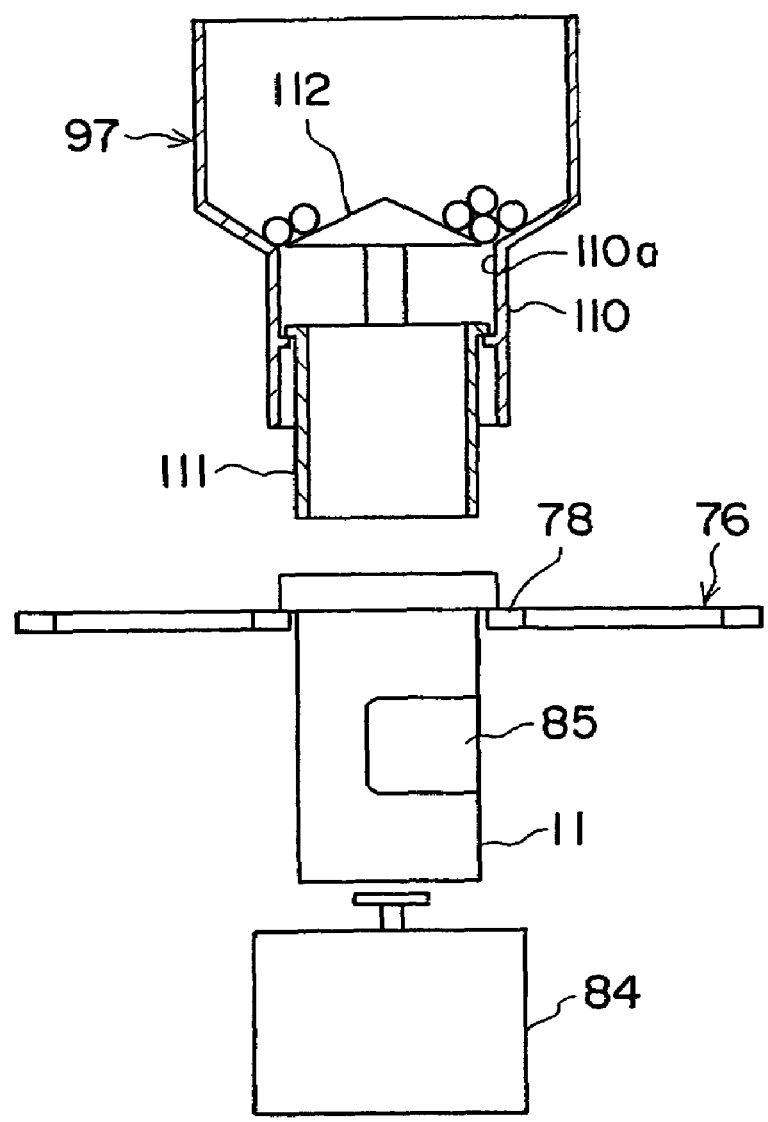
FIG. 14 is a front view illustrating a vessel support portion and a filling hopper in FIG. 11.

The upper openings of the packing hopper 97 and of the discharging hopper 98 are closed and opened by a closing/opening door 103 provided pivotably. The lower end of the packing hopper 97, as shown in FIG. 14, extends so as to gradually reducing its diameter and connects to a lower cylindrical portion 110 to form a step like shape. In the lower cylindrical portion 110, an internal cylinder 111 is disposed so as to move vertically. A hood 112 is fixed on the upper end of the internal cylinder 111 so that the hood 112 can open and close the internal opening 110a of the lower cylindrical portion 110. Thus, when the tablet vessel 11 is raised by the lifter 84 to push up the internal cylinder 111, tablets sustained by the hood 112 are discharged into the tablet vessel 11.

Figure 17:
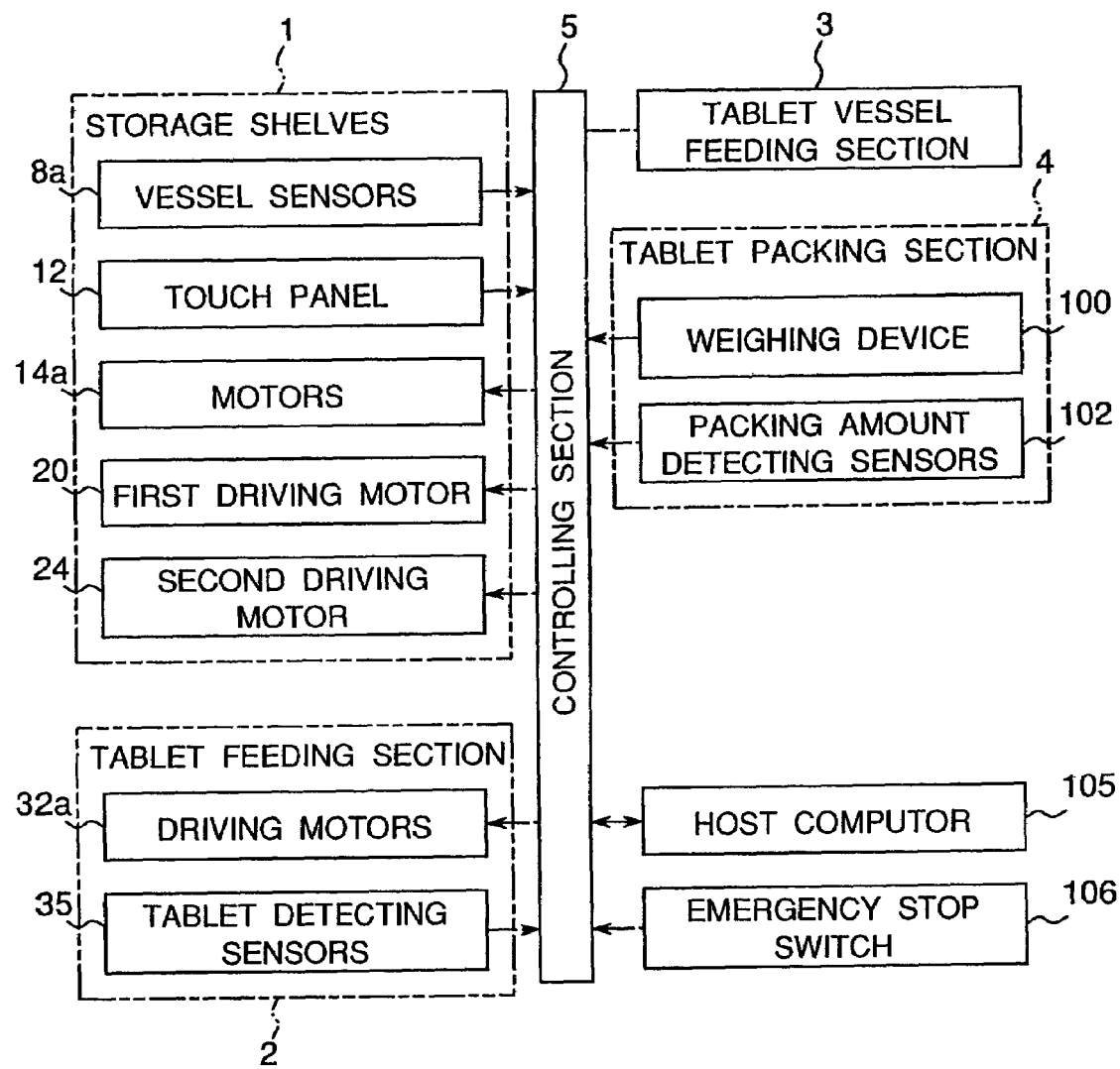
FIG. 17 is a block diagram on the tablet packing apparatus in accordance with the invention.

As shown in FIG. 17, the controlling section 5 receives an input of prescription data from a host computer 105 (or only an input signal from the touch panel 12). The controlling section 5 also receives a signal from or actuates and controls the storage shelves 1 (e.g., the vessel sensors 8a, the touch panel 12, motors 14a, the first driving motor 20, and the third driving motor 24), the tablet feeding section 2 (e.g., the driving motors 32a, and the tablet detecting sensors 35), the tablet vessel feeding sections 3, and the tablet packing section 4 (e.g., the weighing device 100, the packing amount detecting sensors 102) and an emergency stop switch 106 and so on.

The operation of the tablet packing apparatus as arranged above will be described below.

Figure 18:
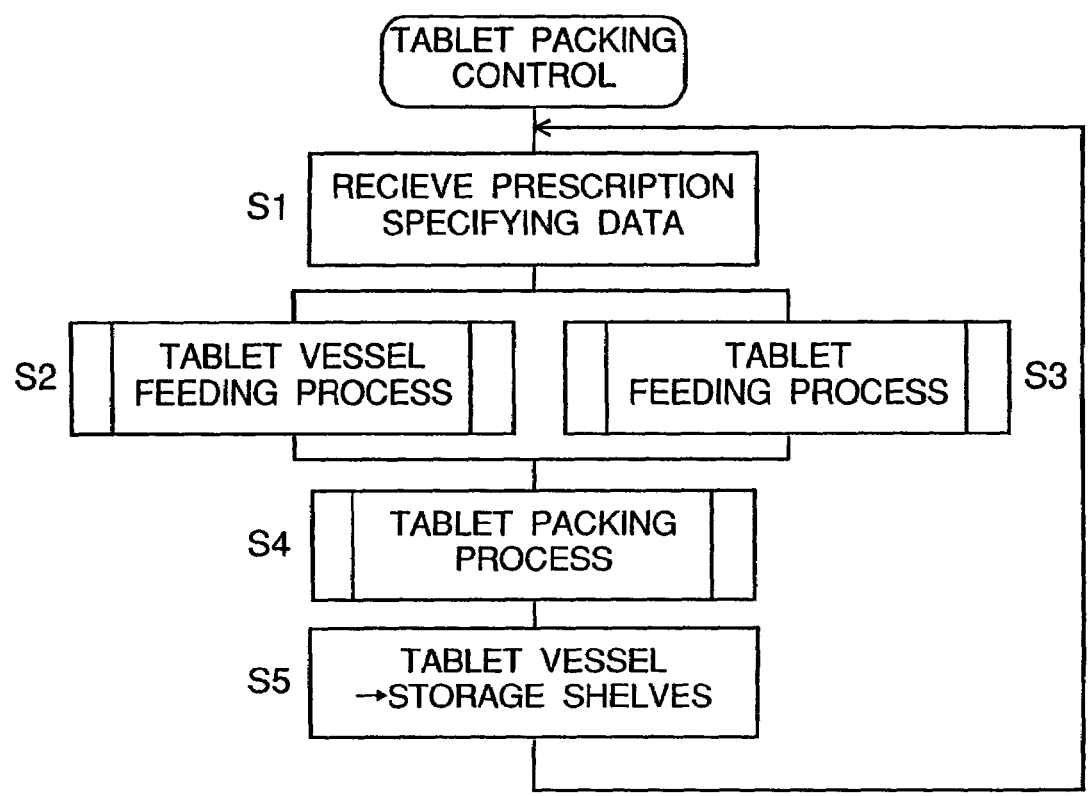
FIG. 18 is a main flow chart illustrating the tablet packing control.

As shown in the flow chart of FIG. 18, first, prescription specifying data based on prescription data is received from the host computer 105 (step S1). A empty tablet vessel feeding process (step S2) and a tablet feeding process (step S3) are then performed simultaneously in parallel on the basis of the prescription specifying data. Subsequently, a tablet packing process (step S4) is performed, and a vessel delivering process (step S5) is then performed for delivering the tablet vessel 11 to the container chamber 6 in the storage shelves 1. The prescription specifying data may be received in multiple according to the processing capacity.

Figure 19:
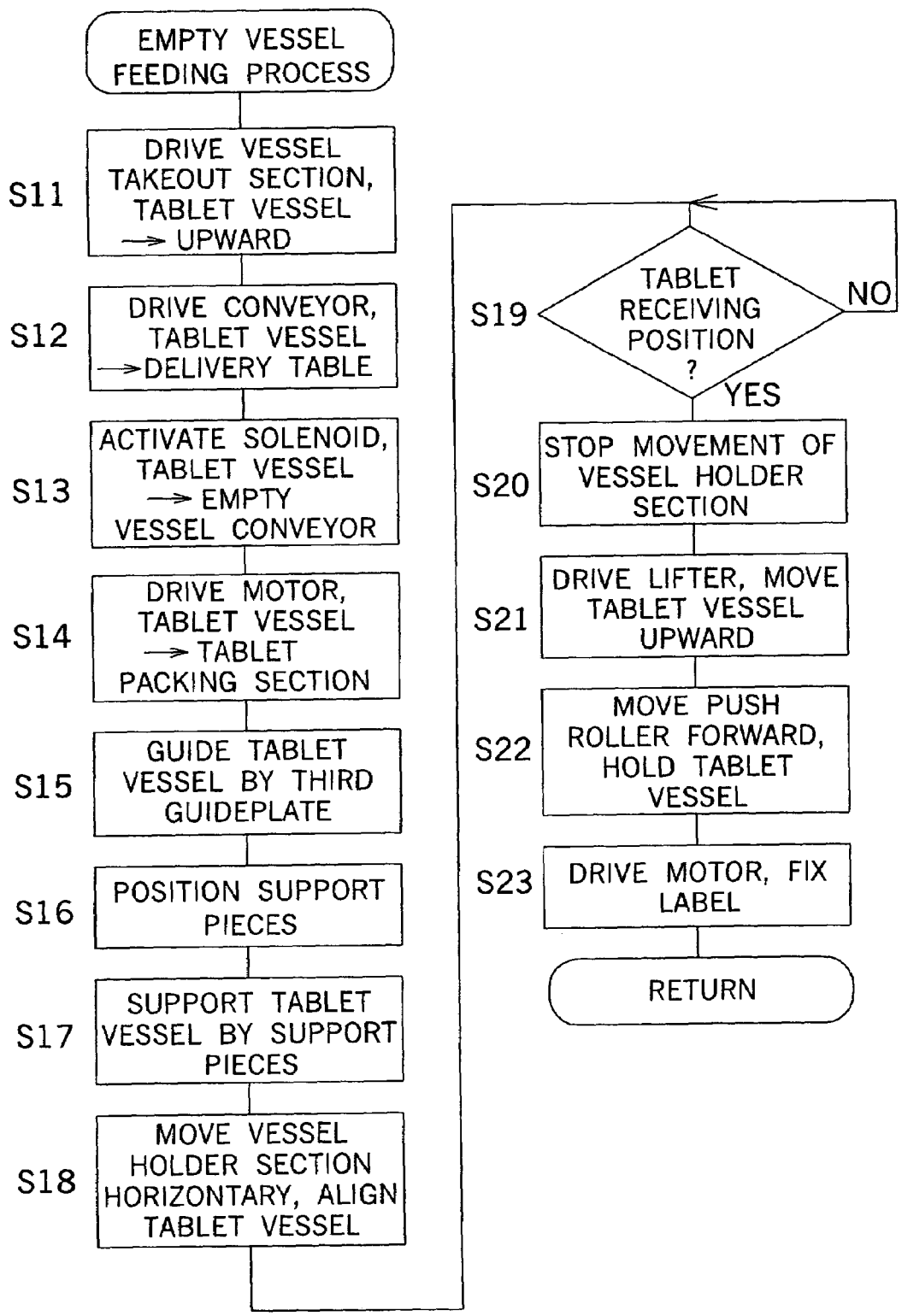
FIG. 19 is a flow chart illustrating an empty vessel feeding process in FIG. 18.

In the empty vessel feeding process, as shown in the flow charts of FIG. 19, in accordance with the above prescription data, the vessel takeout section 52 in the stock container 51 in which the tablet vessels 11 corresponding to the prescription data are contained is operated (step S11). In the vessel takeout section 52, the tablet vessels 11 are conveyed upward in laterally held condition by the lateral vessel holding portions 59. At this time, the vertical vessel eliminating portions 60 prevent the tablet vessels 11 from being held by the lateral vessel holding portions 59 in a vertical condition or in a laterally overlaid condition. Feeding of the next tablet vessel 11 is carried out by operating the vessel takeout section 52 in the stock container 51 when use of the tablet vessel 11 held on the vessel holder section 76 is decided, i.e., when the next prescription data is inputted.

When the tablet vessel 11 is conveyed upward by the vessel takeout section 52, operation of the conveyor 61 is commenced to move the tablet vessel 11 to the delivery table 62 (step S12). Then, activation of the solenoid not shown causes the delivery table 62 to pivot, whereby the tablet vessel 11 is delivered to the empty vessel conveyor 53 (step S13).

In the empty vessel conveyor 53, after the tablet vessel 11 is delivered from the stock container 51, the motor not shown is driven to convey the tablet vessel 11 to the tablet packing section 4 by the conveyor ropes 72 (step S14).

In the tablet packing section 4, the tablet vessel 11 is delivered to the second guide plate 80 through the first guide plate 79 and then guided by the third guide plate 81 (step S15). The vessel holder section 76 is horizontally moved to position the pair of the support pieces 78 corresponding to the size of the tablet vessel 11 to be conveyed at the lower end edge portion of the second guide plate 80 (step S16). Then, the third guide plate 82 is pivoted so that the tablet vessel 11 is supported by the support pieces 78 of the vessel holder section 76 (step S17). As a result, the flange portion of the tablet vessel 11 is supported, whereby the tablet vessel 11 necessarily becomes to be an upwardly opened condition.

The support positions of the tablet vessels 11 on the support pieces 78 are different in accordance with the sizes and the delivery directions of the tablet vessels 11. Therefore, the vessel holder section 76 is horizontally moved, whereby the tablet vessels 11 are aligned by the vessel aligning plate 82 (step S18). If the tablet vessel 11 reaches the tablet receiving position (step S19), then the movement of the vessel holder section 76 is stopped (step S20). Consequently, the lifter 84 is driven to slightly lift the tablet vessel 11 from the vessel holder section 76 (step S21). In this condition, the push rollers 92 are moved forward (step S22), thereby the tablet vessel 11 is held by the push rollers 92 and the guide roller 93. Then, the motor 93a is driven to rotate the guide roller 93 so that the label 85 on which a predetermined information is printed is fixed on the outer surface of the tablet vessel 11 (step S23).

Figure 20:
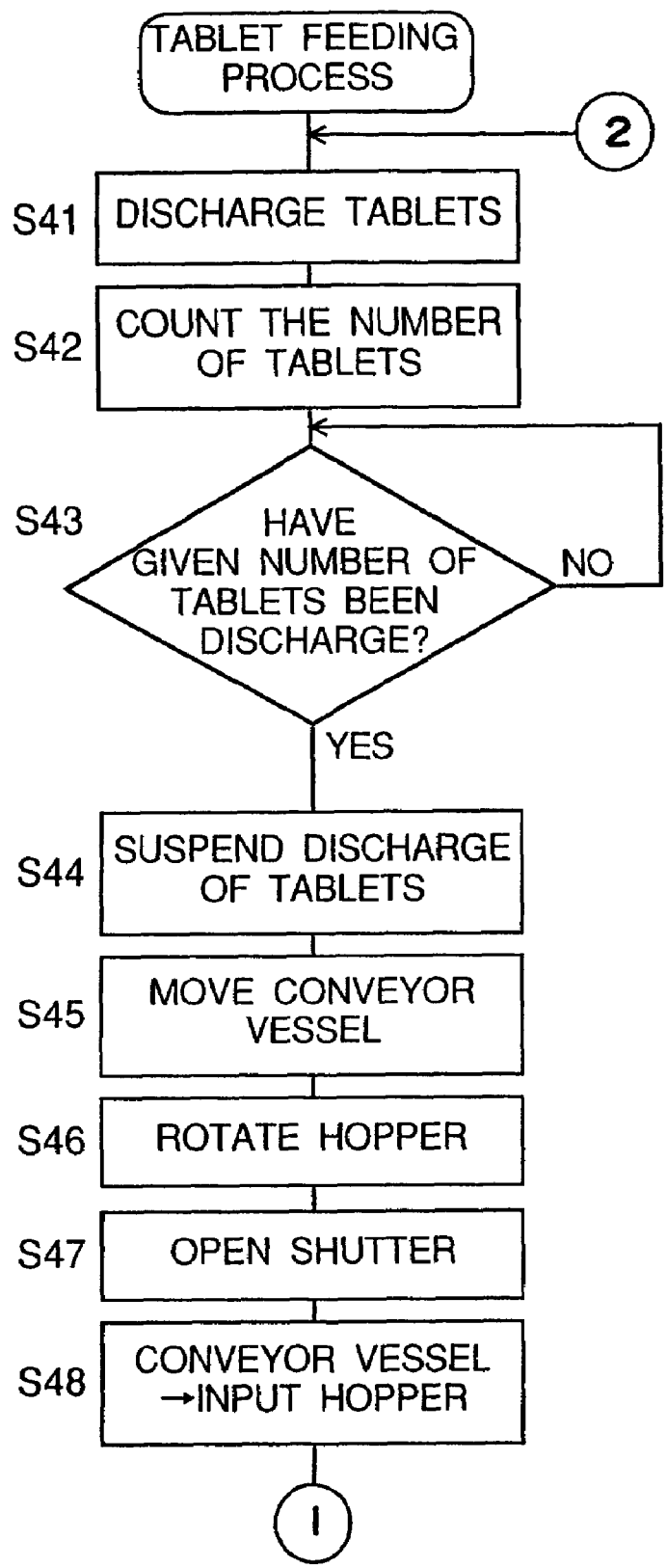
FIG. 20 a flow chart illustrating a tablet feeding process in FIG. 18.
Figure 21:
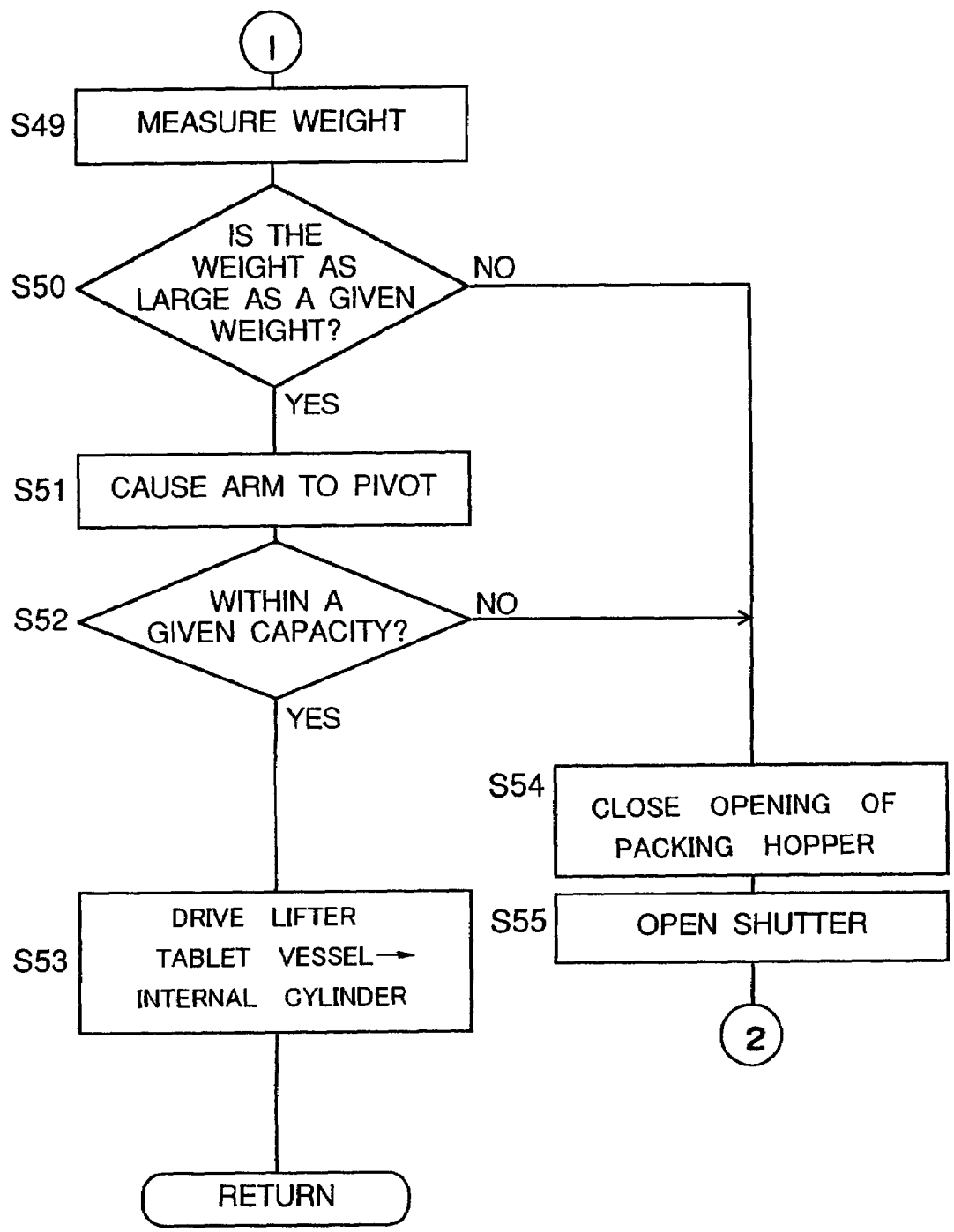
FIG. 21 is a flow chart continued from FIG. 20.

In the tablet feeding process, as shown in the flow chart of FIGS. 20 and 21, a relevant tablet container section 26 is actuated and controlled on the basis of the prescription specifying data. That is, the built-in motor in the relevant motor base 32 is driven to rotate the rotor 39 to discharge a given number of the tablets stored in the feeder vessel 36 (step S41). The number of the discharged tablets is counted by the tablet detecting sensor 35 provided in the fall guide path 34 (step S42). After the given number of tablets are discharged from the feeder vessel 36 through the fall guide path 34 into a common guide path 31 (step S43), the rotation of the rotor 39 is halted to suspend the discharge of tablets (step S44).

The tablet conveyor section 27 is then actuated and controlled; that is, the pulleys 47 are driven and rotated so that the conveyor vessel 46 is moved by the conveyor belt 48 and positioned under the common guide path 31 (step S45). The hopper 44 is then rotated to direct the opening thereof to the conveyor vessel 46 (step S46), and the shutter 43 is opened to allow the tablets to be stored into the conveyor vessel 46 (step S47).

After the given number of the relevant tablets are stored in the conveyor vessel 46, the conveyor vessel 46 is moved to the input hopper 94 by the actuation and control of the tablet conveyor section 27 (step S48). At this time, the protrusion 49a of the shutter 49 comes into contact with an edge of the input hopper 94, and the movement of the conveyor vessel 46 thereby causes the shutter 49 to open gradually, so that the stored tablets are inputted into the weighing vessel 99 through the input hopper 94. The weighing vessel 99 is then suspended slightly above the weighing device 100 by the pivotal motion of the arms 101, so that the impulsive force caused by the input of the tablets cannot act directly on the weighing device 100. Subsequently, the weighing vessel 99 is loaded on the weighing device 100 by the pivotal motion of the arms 101 and the weight of the weighing vessel 99 is measured (step S49).

It is then judged whether the weight is as large as a given weight or not (step S50). The tablets are then fed into the measuring hopper 96 by the pivotal motion of the arms 101 (step S51). Whether the amount of the tablets is within the capacity of the tablet vessel 11 or not is then judged on the basis of detection signals from the packing amount detecting sensors 102 in the measuring hopper 96 (step S52).

In the case that the weight is as large as the given value and that the amount of the fed tablets is not more than the given amount, it is judged that the relevant tablets could be packed by the given amount. Then, the tablet vessel 11 is further lifted by the lifter 84 so that the internal cylinder 111 of the packing hopper 97 is raised (step S53). As a result, the internal opening 110a is opened by the hood 112, whereby the tablets are packed in the tablet vessel.

In the case that the weight is larger or smaller than the given value or that the amount of the fed tablets is larger than the given amount, it is judged that the tablets are irrelevant or that the amount of the tablets exceeds the capacity of the tablet vessel 11. The opening of the packing hopper 97 is then closed (step S54), and the shutter 96a is opened (step S55). The tablets are thus discharged through the discharging hopper 98. In this case, returning to step S41, the tablet feeding process is performed afresh.

After the tablets are packed into the tablet vessel 11, the process for delivering the vessel to the storage shelves 1 is performed. At this time, a using condition of the container chamber 6 is confirmed by referring to a storage shelves data table and a vacant container chambers 6 are specified. The storage shelves data table is established based on detected signal of the vessel sensor 8a provided in each container chamber 6 of the storage shelves 1. Among the vacant container chambers 6, the order of the container chambers 6 in which the tablet vessel 11 is to be delivered is decided. In the present embodiment, the order of positions of the container chambers 6 that an operator can easily take out the tablet vessel 11 is decided.

Figure 22:
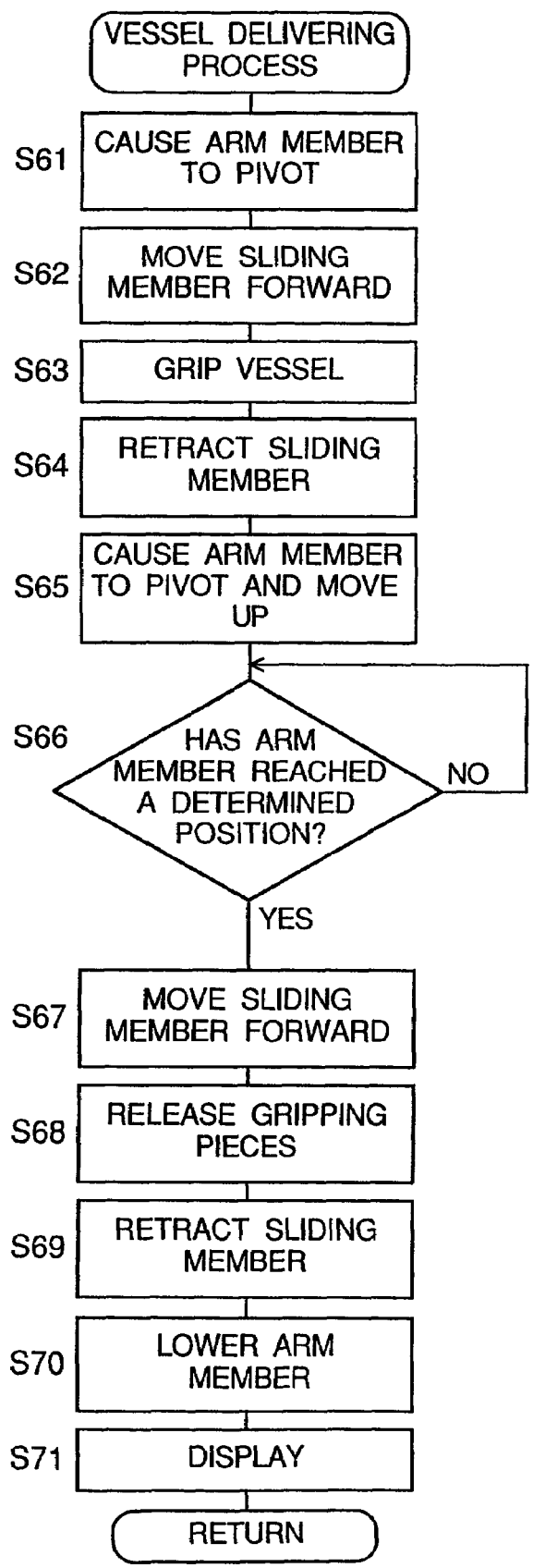
FIG. 22 is a flow chart illustrating a vessel delivering process in FIG. 18.

After the container chamber 6 to which the tablet vessel 11 is to be delivered is decided, as shown in FIG. 22, the arm member 15 is caused to pivot (step S61), the sliding member 22 is moved forward relative to the arm body 19 (step S62), and the tablet vessel 11 is gripped by the gripping pieces (step S63). The sliding member 22 is then retracted (step S64), and the arm member 15 is caused to pivot and elevated (step S65). The position where the arm member 15 is to reach with the pivotal motion and elevation is such a position as determined as described above, i.e., the container chamber 6 from which the operator can easily take out the tablet vessel 11.

Once the arm member 15 reaches the determined position to reach with the pivotal motion and elevation (step S66), a using condition of the container chamber 6 is confirmed again based on the detected signal of the vessel sensor 8a provided in the corresponding container chamber 6. If the tablet vessel 11 is not contained, the sliding member 22 is moved forward to open the door 6a and deliver the gripped tablet vessel 11 to the container chamber 6 in the storage shelves 1 (step S67). The tablet vessel 11 then travels to the recesses 10a while pushing aside the holding plates 9 in the container chamber 6 through the medium of the cutouts 10b formed in the holding lugs 10, and is held with the bias exerted by the spring 9a. The gripping pieces 25 are then released (step S68); the sliding member 22 is retracted (step S69); and the arm member 15 is subsequently lowered (step S70) for the delivery of the next tablet vessel 11. Just before the tablet vessel 11 is contained in the container chamber 6, if a tablet vessel 11 is detected in the container chamber 6, another container chamber 6 in which the tablet vessel 11 can be contained is retrieved and then the tablet vessel 11 is contained in the retrieved container chamber 6.

In the selection of the aimed container chamber 6, the container chambers 6 may be numbered so that the number increases with increase in the period of time required for the delivery of a tablet vessel 11 to the container chamber 6 by the arm member 15, and the vacant container chamber 6 which has the smallest number may be selected as the aimed chamber.

Once the tablet vessel 11 packed with the given amount of the specified tablets is thus delivered to the container chamber 6 in the storage shelves 1, the numbers assigned to the feeder vessels and the counts of the tablets are displayed on the display 7 of the relevant container chamber 6 in response to a detection signal from the vessel sensor 8a (step S71).

In the aforementioned tablet packing apparatus, when an emergency stop button which is provided in both the lower middle portion of the storage shelves 1 and the middle potion of the tablet vessel feeding sections 3 is pressed down, or power supply is cut off due to power failure or the like during the operation, the apparatus is shut down. In this case, the power supply to the motor base 32 which operates the tablet container section 26 is stopped, preventing miss-feeding of the tablets. Whereas, the power supply to the controlling section 5 is not stopped and it is communicated to the controlling section 3 that it is an emergency stop condition. At the normal stop of the power supply, without simultaneously stopping the power supply to both the motor base 32 and the controlling section 5, the power supply to the motor base 32 is stopped first and then the power supply to the controlling section 5 is stopped. The controlling section 5 is possible to receive power supply from a secondary power source not shown, the operating condition is maintained. However, there may arise a case that an information on the tablet vessel 11 and the tablet which had been under conveyance can not be perfectly controlled. Thus, it is required to execute a restoring process in which the tablet vessel 11 and the tablet which had been under conveyance is recovered to reset the information.

In the restoring process which will be explained in detail hereinafter, the tablet vessel 11 and the tablet which had been under conveyance is recovered into the container chambers 6 of the storage shelves 1. Therefore, in the case that there is no room or few room for the container chambers 6, the tablet vessels 11 should be removed from the container chambers 6 so that the restoring process can be executed. Moreover, in the conveyance path of the tablet vessels 11 (the empty vessel conveyor 53, the vessel holder section 76 and so on), the empty vessel conveyor 53 is reversed for a predetermined time to remove the tablet vessel 11 on the empty vessel conveyor 53. In the vessel holder section 76, the size data of the tablet vessel 11 is memorized again by means of the size detecting sensor for detecting the size of the tablet vessel 11 provided between the push rollers 92.

It is preferable to make an indication on the touch panel 12 that the tablet is removed. Since an error that either the feeder vessels 36 or the stock vessel 51 is empty does not shows abnormality, the restoring process is not executed in such case.

Figure 23:
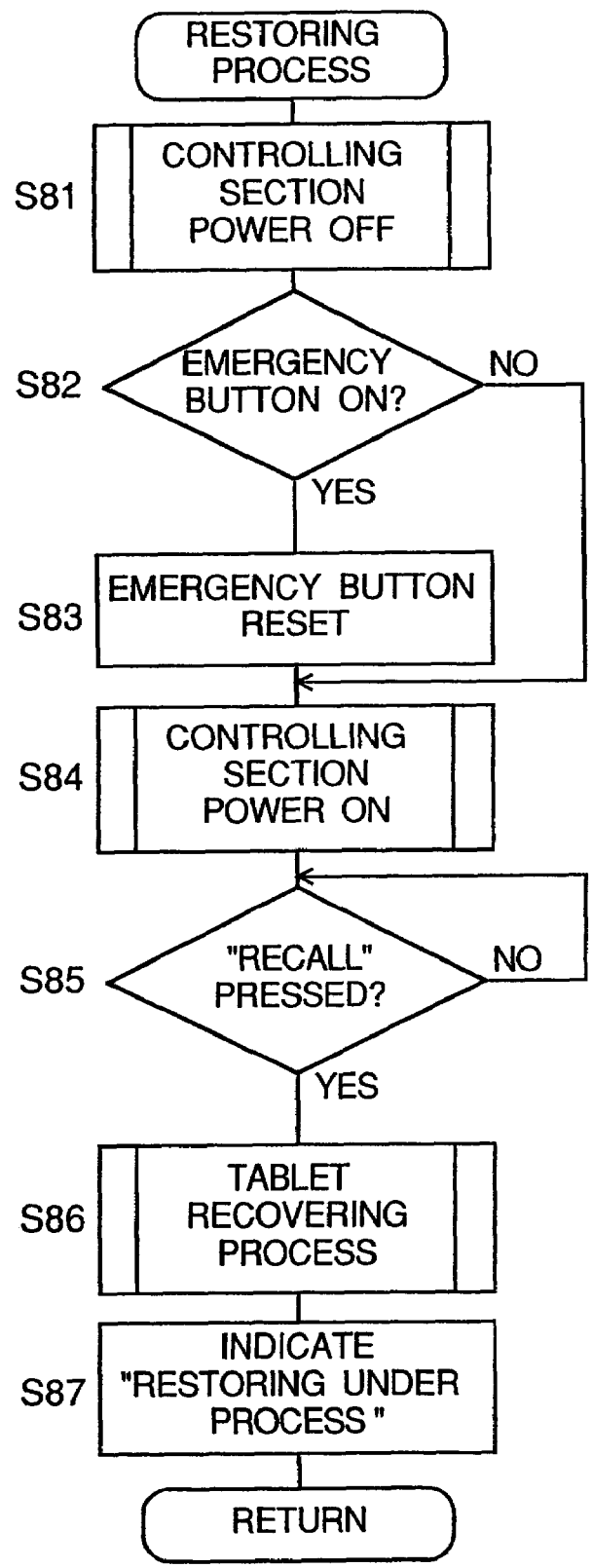
FIG. 23 is a flow chart illustrating a recovery process.

The restoring process will be explained in accordance with the flow chart as shown in FIG. 23.

Figure 25A:
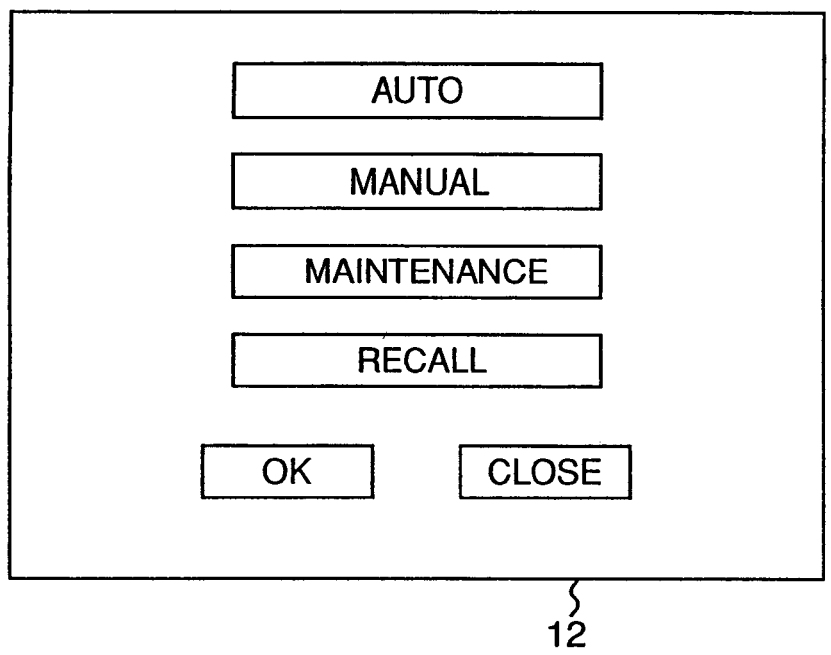
FIGS. 25A and 25B are views illustrating a main menu displayed on a touch panel.
Figure 26A:
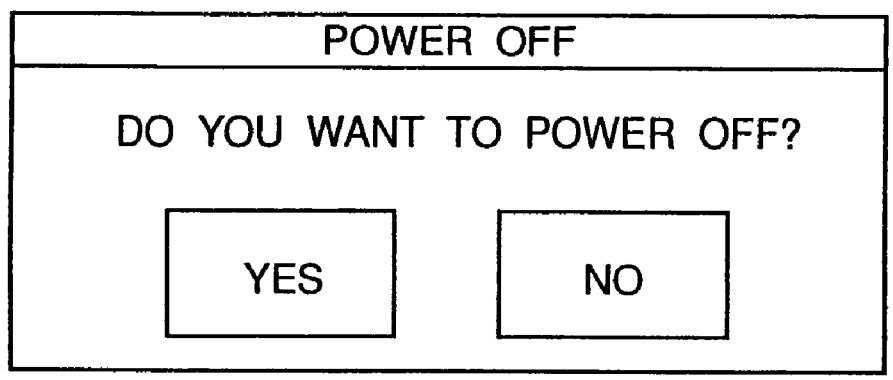
FIGS. 26A and 26B are front views illustrating contents displayed on the touch panel in the case of power-off.
Figure 26B:
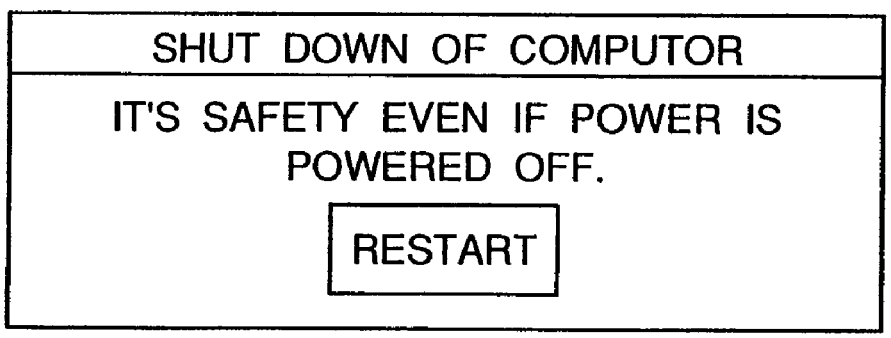

The controlling section 5 is once powered off (step S81). This is because of the deletion of the processing data temporally stored in the memory of the controlling section 5. When an area displayed on the touch panel 12 by "CLOSE" as shown in FIG. 25A is touched, the indications of "DO YOU WANT TO POWER OFF?", "YES" and "NO" are displayed as shown in FIG. 26A. If the "YES" is selected, the indication that "IT'S SAFETY EVEN IF POWER IS POWERED OFF" is displayed as shown in FIG. 26B to power off.

If the emergency stop button is pressed down (step S82), then the emergency stop button is reset (step S83) and the controlling section 5 is powered on again (step S84). Thus, the menu is displayed on the touch panel 12 as shown in FIG. 25A.

Figure 25B:
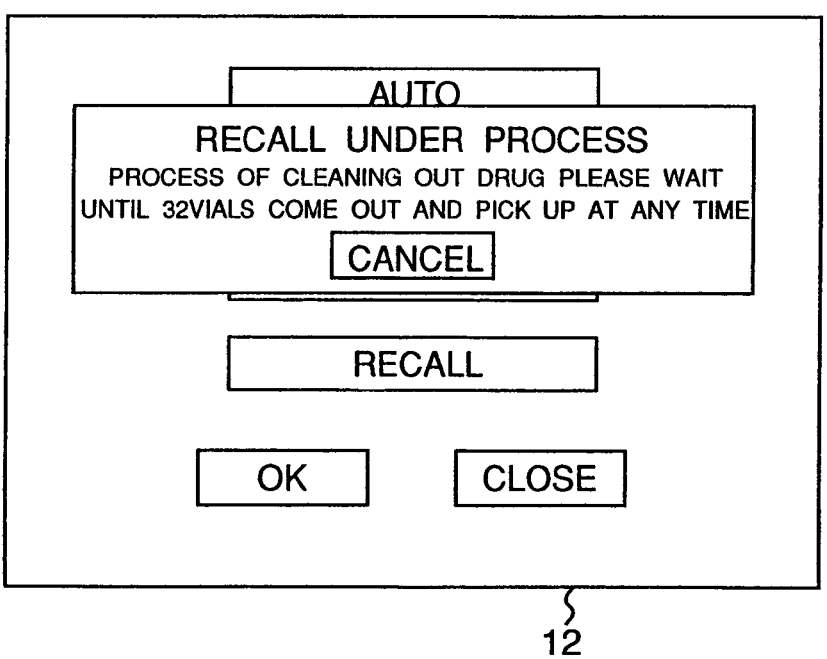

Among the items as shown in FIG. 25A, if the "RECALL" is touched (step S85), then the recovering process of the tablet which had been under conveyance is commenced (step S86). At this time, the indication that "RECALL UNDER PROCESS . . . " is displayed on the touch panel 12 as shown in FIG. 25B to indicate that restoring process is going on (step S87).

Figure 24:
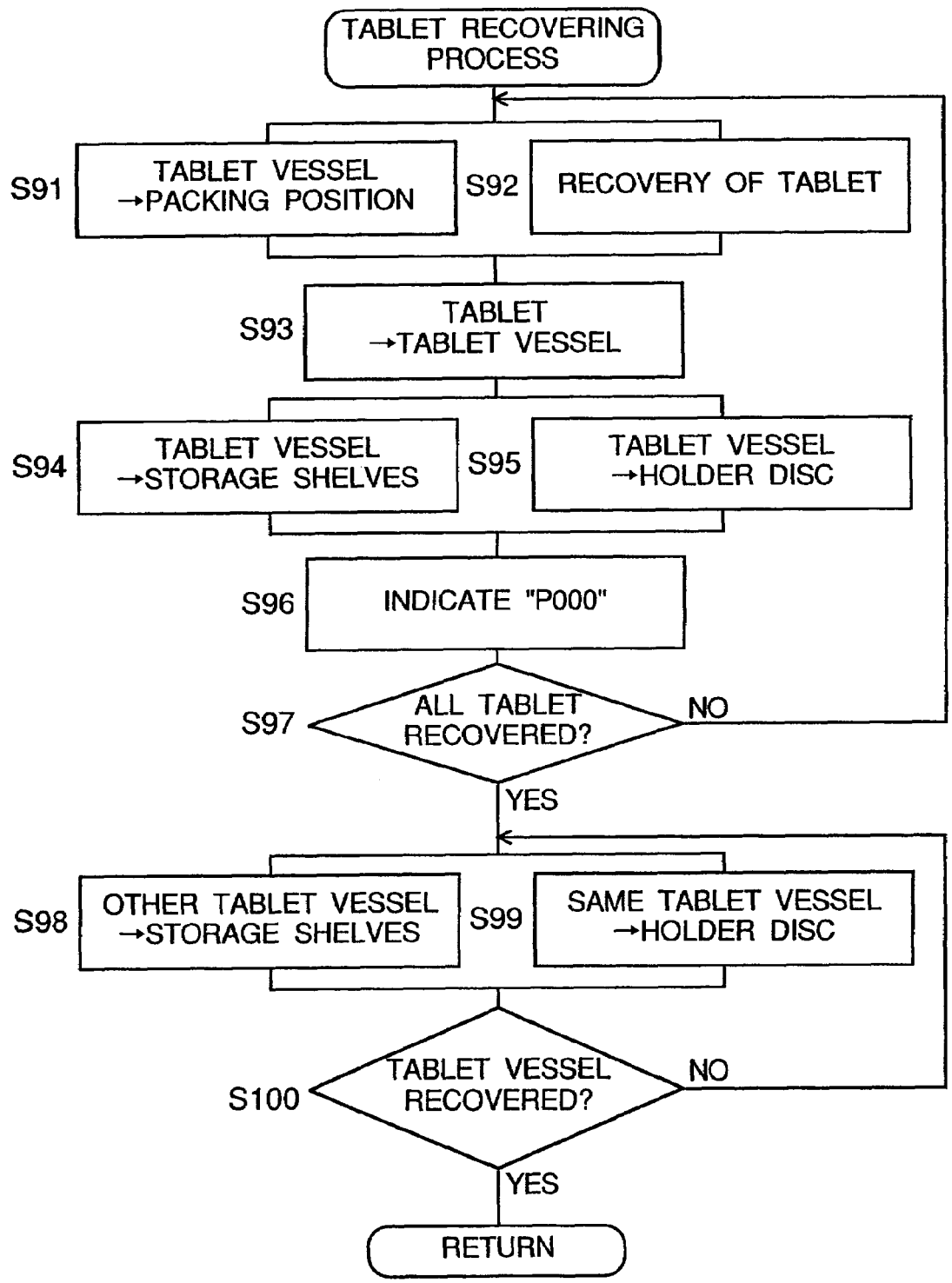
FIG. 24 is a flow chart illustrating the tablet recovering process in FIG. 23.

In the tablet recovering process, the tablets remaining in the conveyor vessels 46 and the hoppers 44 are recovered as shown in flow chart of FIG. 24. At first, the vessel holder section 76 is moved to position the tablet vessel 11 having the largest capacity at the packing position, i.e., beneath the packing hopper 97 (step S91). Normally, since the tablet vessel 11 having the largest capacity is ready on the vessel holder section 76, such tablet vessel 11 is used. If such tablet vessel is not ready, it is replenished from the stock vessel 51. On the other hand, the tablets are recovered from any one of the common guide paths by means of the conveyor vessel 46 (step S92). Then, the tablets are packed into the largest tablet vessel 11 through the input hopper 94 and the packing hopper and so on (step S93). Consequently, the tablet vessel 11 packed with the tablets is transferred to the container chamber 6 of the storage shelves 1 by the arm member 15. At the same time, a tablet vessel 11 having the same size as the tablet vessel transferred to the storage shelves 1 is replenished to the vessel holder section 76 (step S95). In addition, the indication of "P000" is displayed on the display 7 (step S96) to enable an operator to distinguish at a glance that the recovered tablets are packed in the tablet vessel 11 transferred to the container chamber 6.

In the same manner as explained above, a tablet vessel 11 having the largest capacity is replenished to the vessel holder section 76 from the stock vessel 51 to recover the tablets remaining in the another common guide paths 31. Although there may be no tablet in the common guide paths 31, the recovery process of tablets should be executed from all of the common guide paths 31 in order to perfectly grasp which tablets had been under conveyance.

If the tablets remaining in all common paths 31 (step S97) is recovered, then other size of the tablet vessels 11 held on the vessel holder section 76 are recovered to the storage shelves 1 (step S98). In this case, the tablet vessels 11 having the same size as that of the tablet vessels 11 which are recovered and transferred to the container chamber 6 of the storage shelves 1 are replenished to the vessel holder section 76 from the corresponding stock vessel 51 (step S99).

If the recovery of the tablet vessels is finished (step S100), then main menu is displayed on the touch panel 12. The touch with "AUTO" enables the restoration to the normal operation, i.e., the tablet vessel feeding process is (step S2), the tablet feeding process (step S3) and the tablet packing process (step S4) in the same manner as described before.

In the above explained restoring process, in the case that the tablet packing apparatus is stopped due to the abnormality, the controlling section 5 is always powered off to clear the processing data stored in the memory. However, it may be also possible to have the operator select whether such processing data is utilized or not. For example, when the indication of "RECALL" displayed on the touch panel 12, the processing data which are stored before the apparatus is stopped may be utilized to continue the process. In this case, the tablet vessels 11 remaining in the empty vessel conveyor 53, the vessel holder section 76 and so on, or the tablets remaining in the common guide paths 31 and the like are not necessary to be recovered.

Moreover, in the above explained restoring process, the indication of "P000" indicating recovery is displayed on the display 7 of the container 30 chamber 6. Instead of this, it is also possible to indicate which feeder vessel 36 the tablets were discharged from. In this case, it is necessary to memorize the common guide path from which the tablets were recovered based on the position of the conveyor vessel 46. Thus, according to both the memorized common guide path and the processing data, it is possible to specify the feeder vessel 36 from which the tablets were discharged.

Often times tablets to be contained in the tablet feeding section 2 include specially administrative tablets (for example, pyrine medicines and histamine tablets which cause allergy). Therefore, if a packing operation is carried out through a common passage, there would be a risk that the drug forming the specially administrative tablets would intermingle or mix with the other tablets due to the troubles and so on of the apparatus. Therefore, it is preferable to provide a particular dispensing apparatus, in the tablet feeding section 2, containing the specially administrative tablets.

Figure 27A:
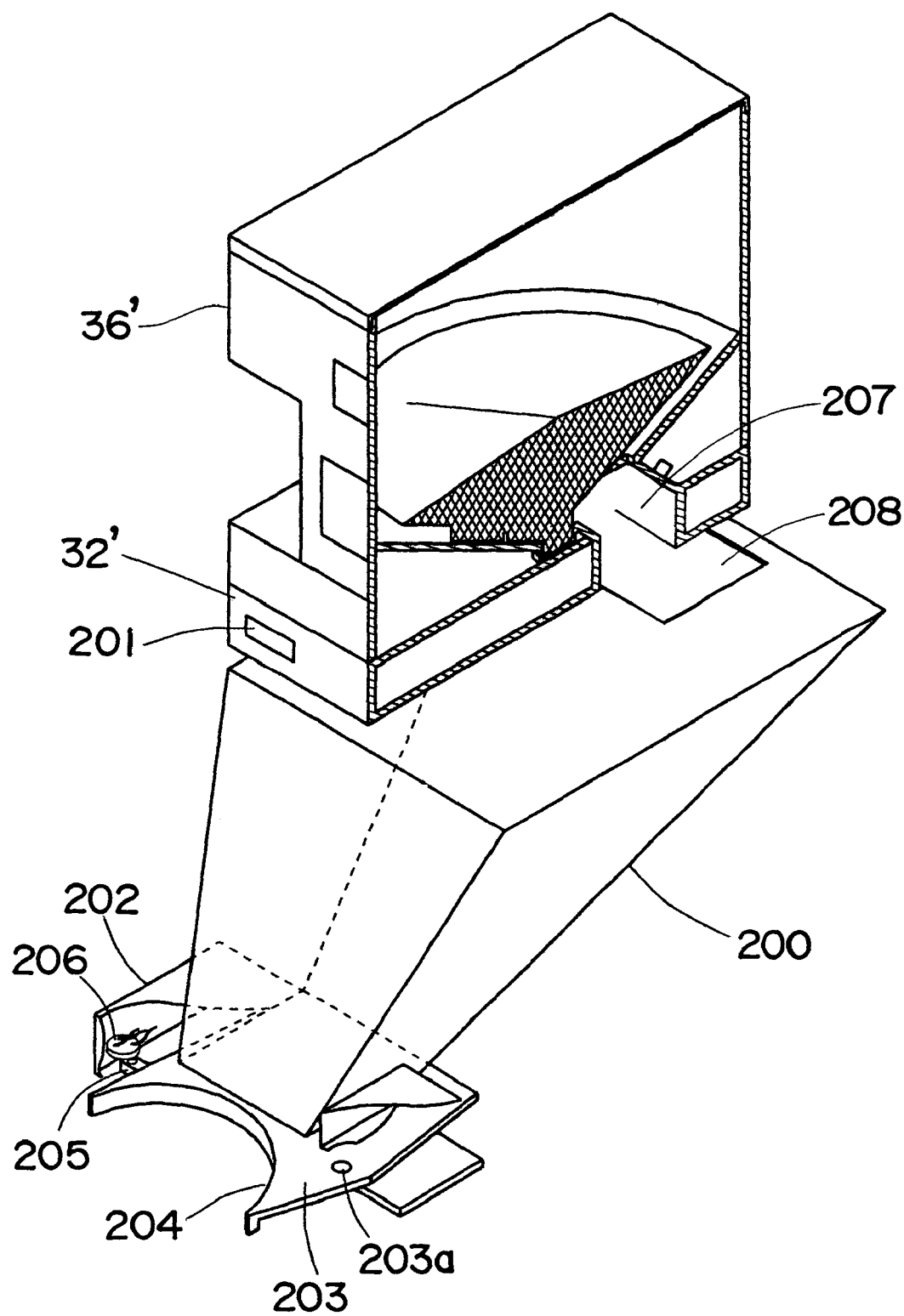
FIG. 27A is a perspective view, in part section, illustrating a particular dispensing apparatus for specially administrative tablets.
Figure 27B:
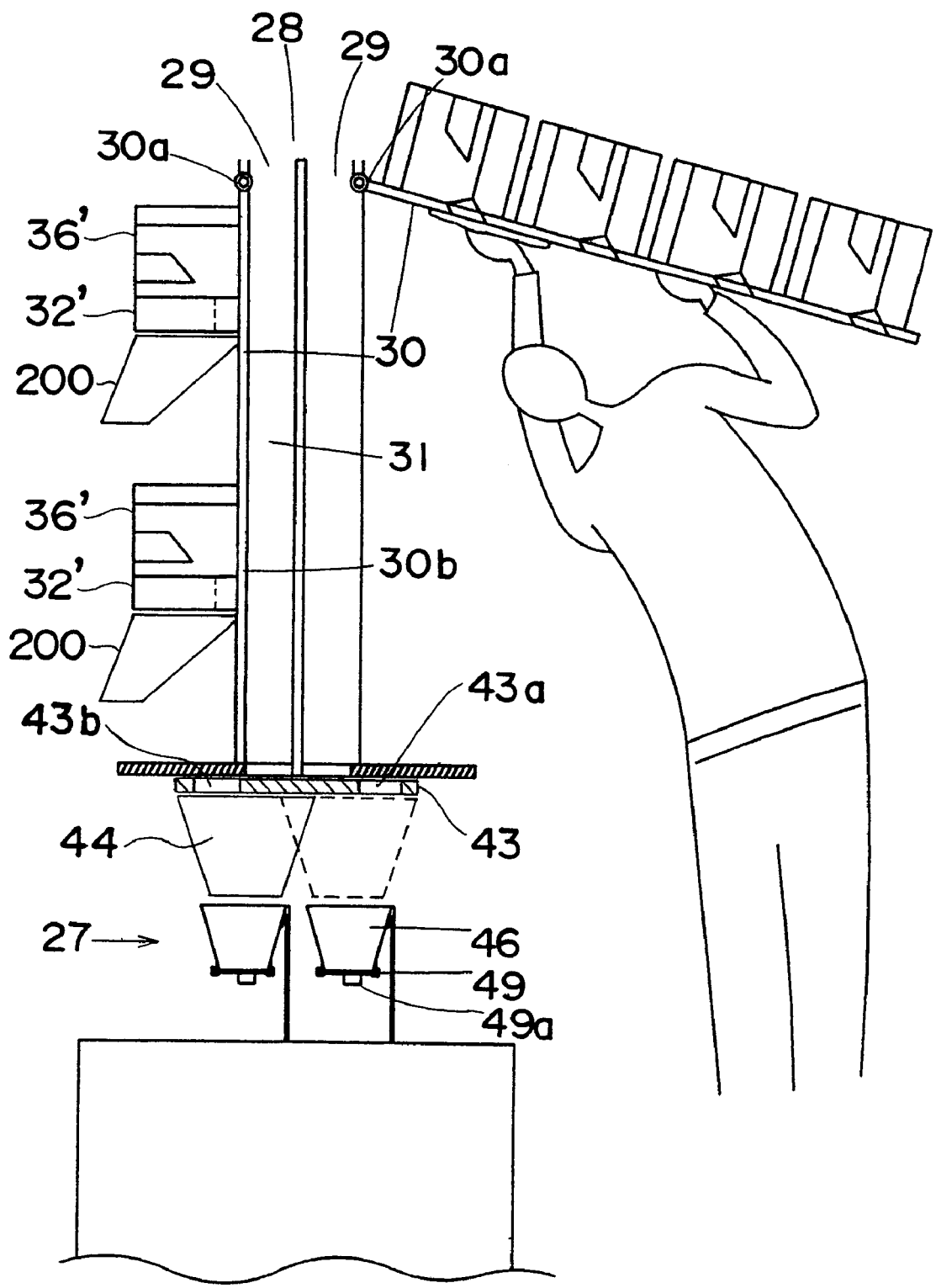
FIG. 27B is a sectional view illustrating an example of a tablet container section in FIG. 1 provided the particular dispensing apparatus of FIG. 27A.
Figure 27C:
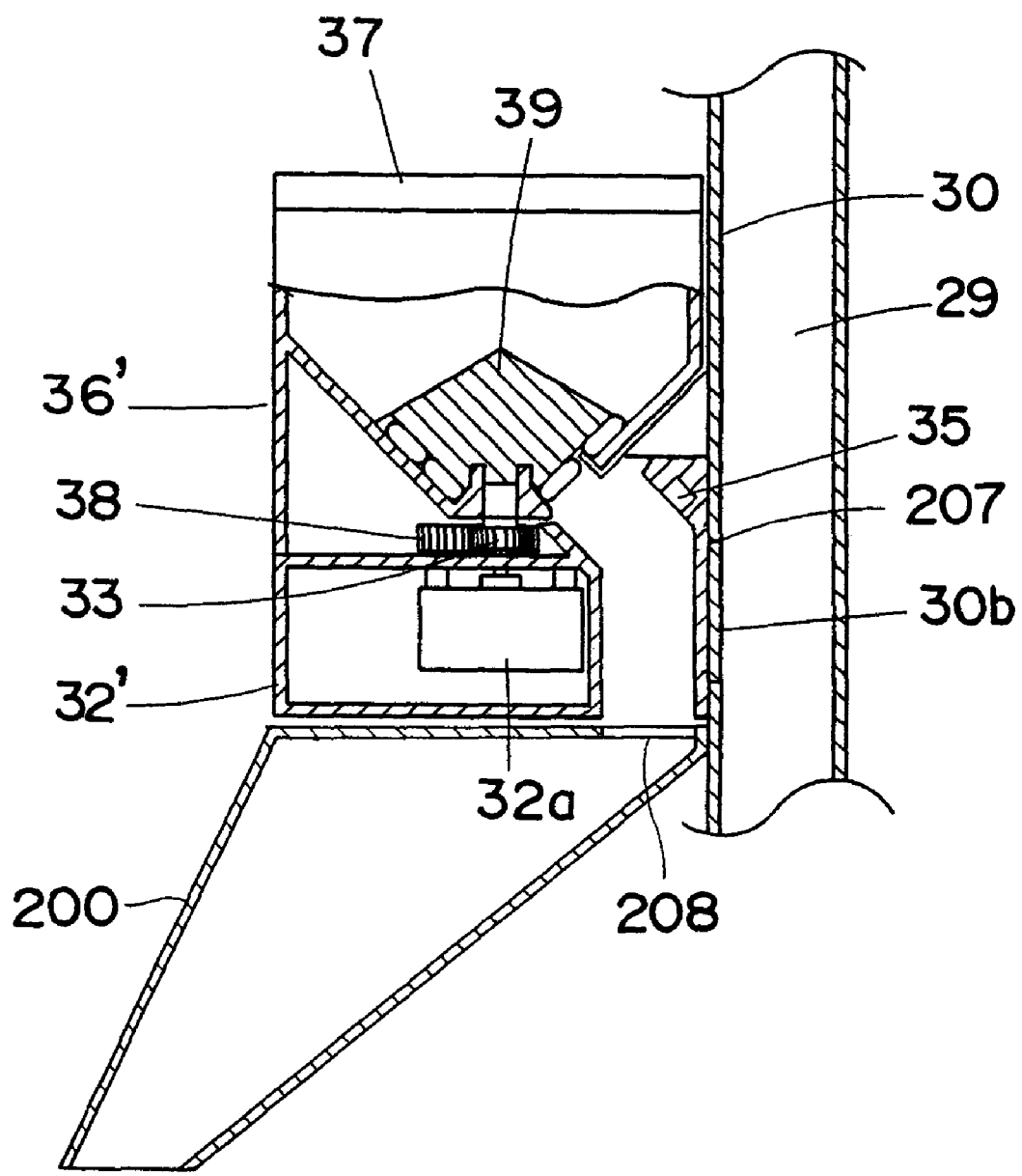
FIG. 27C is a sectional view illustrating the motor base and the feeder vessel of the particular dispensing apparatus of FIG. 27A.

As shown in FIG. 27A and FIG. 27C, the particular dispensing apparatus comprises a tablet reserving member 200 for temporarily reserving the tablets fed from the motor base 32'. An upper opening 208 of the tablet reserving member 200 communicates with a fall guide path 207 in the motor base 32'. An LED 201 is provided on the front surface of the motor base 32'. The LED 201 is ON when the tablets are received in the tablet reserving member 200 from the motor base 32'. The lower opening of the tablet reserving member 200 can be closed by a shutter 203 which is rotatably supported around a support shaft 203a on a support member 202. The shutter 203 is formed with an arc-like cutout 204 on its front edge and also provided with a detection piece 205 on its side edge. The cutout 204 is arranged so as to engage the flange of the tablet vessel with the internal edge of the cutout 204 in order to position the tablet vessel 11 to push the shutter 203. The detection piece 205 is detected by a sensor 206 provided on the support member 202 when the lower opening of the tablet reserving member 200 is closed by the shutter 203. The shutter 203 is urged by urging means such as a spring or the like (not shown) so that the lower opening of the tablet reserving member 200 can be closed.

In the tablet feeding section 2 with the particular dispensing apparatus having the above-described construction, when the motor base 32' is driven and the specially administrative tablets are received in the tablet reserving member 200, the LED 201 is ON. Thus, an operator can recognize at a glance from which tablet feeding section 2 the specially administrative tablets were discharged. Then, the operator sets the tablet vessel 11 on the particular dispensing apparatus of the tablet feeding section 2 in which the LED 201 is ON. Consequently, with the tablet vessel 11 engaged with the cutout 204, the operator pushes the shutter 203. As a result, the shutter 203 is pivoted around the support shaft 203a against the force of the urging means. Thus, the upper opening of the tablet vessel 11 can communicate with the lower opening of the tablet reserving member 200, and thereby the specially administrative tablets in the tablet reserving member 200 are packed or received in the tablet vessel 11. At this time, as the sensor 206 does not detect the detection piece 205 of the shutter 203, the LED 201 is OFF.

Figure 28:
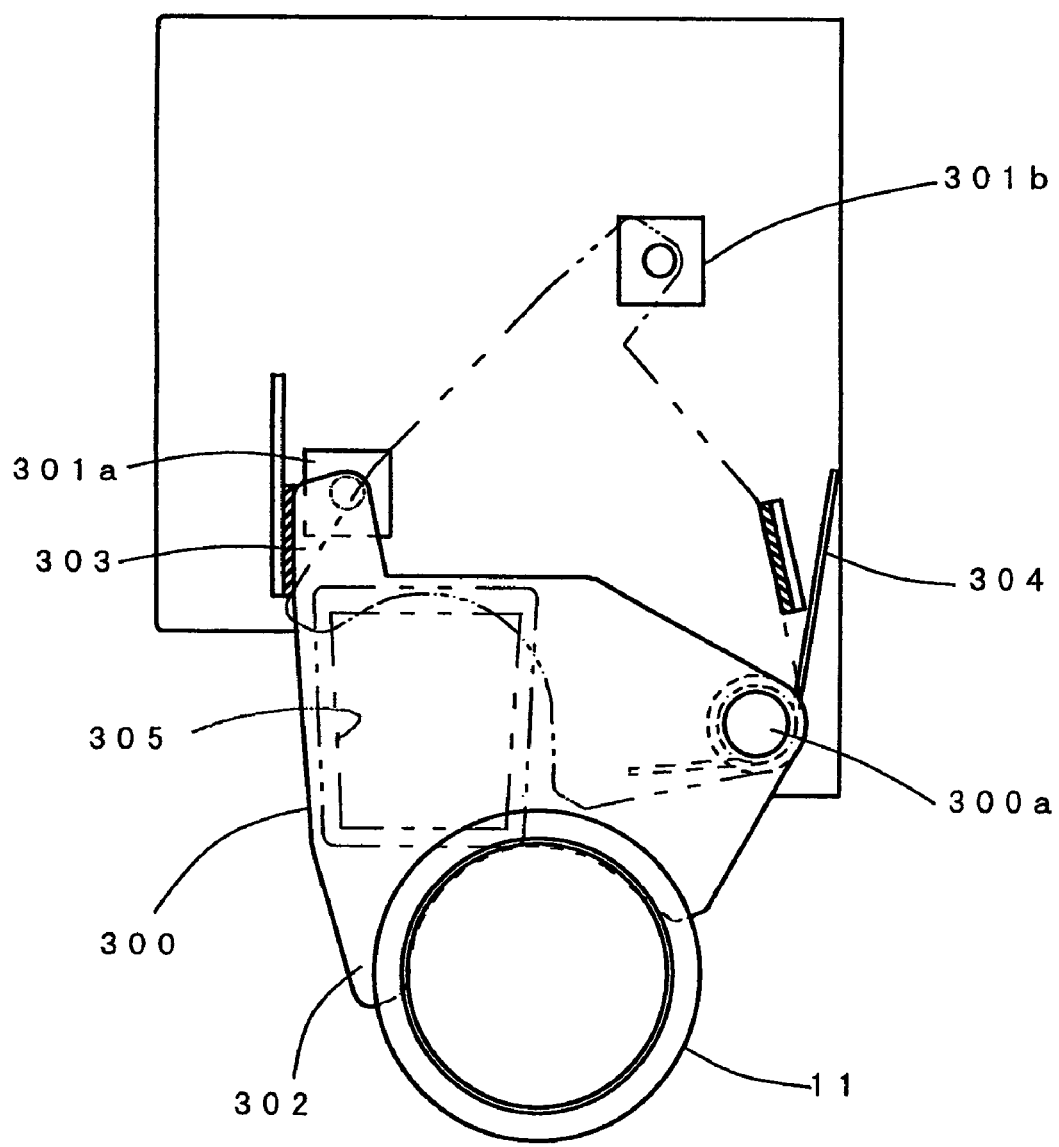
FIG. 28 is a plan view illustrating a tablet feed section provided with a particular dispensing apparatus according to an another embodiment.

Instead of the tablet reserving member 200 shown in FIGS. 27A–27C, a tablet reserving member having such a construction as shown in FIG. 28 with a shutter 300 and sensors 301a, 301b can be adopted.

The shutter 300 has a fan-shape. On the front edge thereof the shutter 300 is formed with a guide portion 302 comprising an arc-like cutout, while on the rear edge thereof the shutter 300 is formed with a protrusion 303 which is detected by sensors 301a, 301b. The shutter 300 is urged in a counterclockwise direction in FIG. 28 around a support shaft 301a by a spring 304 provided around the support shaft 300a. Therefore, if no load is applied, the shutter 300 closes the lower opening 305 of the tablet reserving member. The guide portion 302 is directed toward the front side, allowing the upper opening of the tablet vessel 11 to position easily in place. The protrusion 303 is detected by the sensor 301a, i.e., the closed condition of the shutter 300 is detected by the sensor 301a, whereby the tablets can be fed from the motor base 32. However, after the tablets are discharged in the tablet reserving member, the tablets can not be fed from the motor base 32 unless the opened condition of the shutter 300 is detected. Thus, the feed of the tablets are controlled based on the signals from the sensors 301a, 301b and the motor base 32, whereby the feed of the tablets can be constantly properly conducted.

In the aforementioned embodiment, to the tablet feeding section 2 with the specially administrative tablets contained, the tablet reserving member 200 of the particular dispensing apparatus is directly fixed. However, the tablet reserving member 200 may be connected to the tablet feeding section 2 via a tube or so. Thus, it is possible that the tablet reserving member 200 have a mounting and dismounting construction and is disposed at a proper position to dispense the specially administrative tablets.

Although the present invention has been fully described by way of the examples with reference to the accompanying drawing, it is to be noted that here that various changes and modifications will be apparent to those skilled in the art. Therefore, unless such changes and modifications otherwise depart from the spirit and scope of the present invention, they should be construed as being included therein.

What is claimed:

1. A tablet packing apparatus, the apparatus comprising:
a plurality of feeder vessels containing the tablets;
a plurality of motor bases mounted on said feeder vessels, respectively;
a tablet reserving member disposed below at least one of the motor bases, the tablet reserving member reserving the tablets fed from the respective feeder vessel; and
a shutter which is movable to open and close a lower opening of the tablet reserving member, whereby when setting a tablet vessel beneath the tablet reserving member and moving the shutter to open the lower opening of the tablet reserving member, the tablets contained in the tablet reserving member are fed into the tablet vessel, the apparatus further comprising:
a LED which is turned on when the tablets are fed to the tablet reserving member; and
a sensor for detecting an opening operation or a closing operation of the shutter;
wherein when the sensor detects the opening operation of the shutter, the LED is turned off.

2. The tablet packing apparatus as in claim 1, wherein after the tablets are discharged in the tablet reserving member and the LED is turned on, the tablets can not be fed from the motor base unless the opened condition and subsequent closed condition of the shutter is detected by the sensor.

3. The tablet packing apparatus as in claim 2, wherein the shutter is urged so as to close the lower opening of the tablet reserving member, whereby when engaging the tablet vessel with the shutter to push the shutter against an urged force, the lower opening of the tablet reserving member is opened.

4. The tablet packing apparatus as in claim 1, wherein the shutter is urged so as to close the lower opening of the tablet reserving member, whereby when engaging the tablet vessel with the shutter to push the shutter against an urged force, the lower opening of the tablet reserving member is opened.

5. The tablet packing apparatus as in claim 4, wherein the shutter is formed with an arc-like cutout portion with which the tablet vessel engages.

6. A tablet packing apparatus, the apparatus comprising:
a plurality of feeder vessels containing the tablets;
a plurality of motor bases mounted on said feeder vessels, respectively;
a tablet reserving member disposed below at least one of the motor bases, the tablet reserving member (200) reserving the tablets fed from the respective feeder vessel; and
a shutter which is movable to open and close the lower opening of the tablet reserving member such that, when setting the tablet vessel beneath the tablet reserving member and moving the shutter to open a lower opening of the tablet reserving member, the tablets contained in the tablet reserving member (200) are fed into the tablet vessel;
wherein a sensor for detecting an opening operation or a closing operation of the shutter is provided; and
wherein after the tablets are discharged in the tablet reserving member, the tablets can not be fed from the mounting base unless the opened condition and subsequent closed condition of the shutter is detected by the sensor.

7. The tablet packing apparatus as in claim 6, wherein the shutter is urged so as to close the lower opening of the tablet reserving member, whereby when engaging the tablet vessel with the shutter to push the shutter against an urged force, the lower opening of the tablet reserving member is opened.

* * * * *

UNITED STATES PATENT AND TRADEMARK OFFICE
CERTIFICATE OF CORRECTION

| | |
|---|---|
| PATENT NO. | : 7,040,070 B2 |
| APPLICATION NO. | : 10/664079 |
| DATED | : May 9, 2006 |
| INVENTOR(S) | : Shoji Yuyama et al. |

Page 1 of 1

It is certified that error appears in the above-identified patent and that said Letters Patent is hereby corrected as shown below:

IN THE SPECIFICATION

Column 8, line 26, change "printing" to --printing,--.
Column 11, line 57, insert --25-- after "pieces".

Signed and Sealed this

Tenth Day of April, 2007

JON W. DUDAS
*Director of the United States Patent and Trademark Office*